US012764790B2

(12) United States Patent
Singh et al.

(10) Patent No.: US 12,764,790 B2
(45) Date of Patent: Oct. 13, 2026

(54) TECHNIQUE FOR USING CHANNEL OCCUPANCY TIME

(71) Applicant: Telefonaktiebolaget LM Ericsson (publ), Stockholm (SE)

(72) Inventors: Bikramjit Singh, Kirkkonummi (FI); Sorour Falahati, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 371 days.

(21) Appl. No.: 18/560,224

(22) PCT Filed: May 10, 2022

(86) PCT No.: PCT/SE2022/050457
§ 371 (c)(1),
(2) Date: Nov. 10, 2023

(87) PCT Pub. No.: WO2022/240343
PCT Pub. Date: Nov. 17, 2022

(65) Prior Publication Data

US 2025/0344244 A1 Nov. 6, 2025

Related U.S. Application Data

(60) Provisional application No. 63/186,244, filed on May 10, 2021.

(51) Int. Cl.

| | |
|---|---|
| ***H04W 74/0816*** | (2024.01) |
| ***H04W 72/0446*** | (2023.01) |
| ***H04W 74/00*** | (2009.01) |

(52) U.S. Cl.
CPC ... *H04W 74/0816* (2013.01); *H04W 72/0446* (2013.01); *H04W 74/002* (2013.01)

(58) Field of Classification Search
CPC ........... H04W 72/0446; H04W 74/002; H04W 74/0808; H04W 74/0816
See application file for complete search history.

(56) References Cited

U.S. PATENT DOCUMENTS

2020/0059961 A1* 2/2020 Do .................... H04W 72/0453
2020/0359411 A1* 11/2020 Li ......................... H04W 16/14
2021/0051720 A1* 2/2021 Thyagarajan ..... H04W 74/0816
(Continued)

OTHER PUBLICATIONS

International Search Report and Written Opinion dated Jul. 11, 2022 for International Application No. PCT/SE2022/050457 filed May 10, 2022, consisting of 10-pages.
(Continued)

*Primary Examiner* — Kashif Siddiqui
(74) *Attorney, Agent, or Firm* — Weisberg I.P. Law, P.A.

(57) ABSTRACT

A method of radio communicating between a radio device and a network node of a radio access network, RAN, using a temporal radio resource associated with a channel occupancy time, COT. The method is performed by the radio device or initiated by the radio device by at least one of: determining if a first COT is initiated by the radio device; determining if a second COT is initiated by the network node; and radio communicating with the network node in the temporal radio resource associated with the first COT or the second COT depending on the determinations, wherein determinations are based on information in a DCI message.

18 Claims, 12 Drawing Sheets

(56) References Cited

U.S. PATENT DOCUMENTS

| | | | | |
|---|---|---|---|---|
| 2021/0378011 | A1* | 12/2021 | Luo | H04W 72/23 |
| 2022/0015146 | A1* | 1/2022 | Rune | H04W 74/0816 |
| 2022/0046708 | A1* | 2/2022 | Sun | H04W 74/0816 |
| 2022/0053562 | A1* | 2/2022 | Chande | H04W 74/0808 |

OTHER PUBLICATIONS

3GPP TS 38.214 V16.1.0; 3rd Generation Partnership Project; Technical Specification Group Radio Access Network; NR; Physical layer procedures for data (Release 16), Mar. 2020, consisting of 151-pages.

3GPP TS 38.321 V16.0.0; 3rd Generation Partnership Project; Technical Specification Group Radio Access Network; NR; Medium Access Control (MAC) protocol specification (Release 16), Mar. 2020, consisting of 141-pages.

ETSI EN 301 893 V2.1.1; Harmonised European Standard; 5GHz RLAN; Harmonised Standard covering the essential requirements of article 3.2 of Directive 2014/53/EU; May 2017, consisting of 122-pages.

3GPP TSG RAN WG1 Meeting #103-e R1-2009781; Title: Summary#4 on Enhancements for URLLC/IIoT on Unlicensed Band; Agenda Item: 8.3.2; Source: Moderator (Ericsson); Document for: Discussion and Decision; Date and Location: Oct. 26-Nov. 13, 2020, Online, consisting of 104-pages.

3GPP TSG RAN WG1 Meeting #104-e R1-2101203; Title: Enhancements for unlicensed band URLLC/IIoT; Agenda Item: 8.3.2; Source: Samsung; Document for: Discussion and Decision; Date and Location: Jan. 25-Feb. 5, 2021, e-Meeting, consisting of 9-pages.

3GPP TSG RAN WG1#104-e R1-2101540; Title: Enhancements for unlicensed band URLLC/IIoT; Agenda Item: 8.3.2; Source: Sharp; Document for: Discussion and Decision; Date and Location: Jan. 25-Feb. 5, 2021, e-Meeting, consisting of 8-pages.

3GPP TSG RAN Meeting #83 RP-190706 (revision of RP-182878); Title: Revised WID on NR-based Access to Unlicensed Spectrum; Agenda Item: 9.4.6; Source: Qualcomm Inc; Document for: Approval; Date and Location: Mar. 18-21, 2019, Shenzhen, China, consisting of 8-pages.

ETSI TS 137 213 V16.5.0; Technical Specification; LTE; 5G; Physical layer procedures for shared spectrum channel access (3GPP TS 37.213 version 16.5.0 Release 16); Apr. 2021, consisting of 29-pages.

ETSI TS 138 212 V16.2.0; Technical Specification; 5G; NR; Multiplexing and channel coding (3GPP TS 38.212 version 16.2.0 Release 16); Jul. 2020, consisting of 154-pages.

ETSI TS 138 213 V16.5.0; Technical Specification; 5G; NR; Physical layer procedures for control (3GPP TS 38.213 version 16.5.0 Release 16); Apr. 2021, consisting of 188-pages.

3GPP TS 38.211 V16.1.0; 3rd Generation Partnership Project; Technical Specification Group Radio Access Network; NR; Physical channels and modulation (Release 16), Mar. 2020, consisting of 130-pages.

ETSI TS 138 213 V16.4.0; Technical Specification; 5G; NR; Physical layer procedures for control (3GPP TS 38.213 version 16.4.0 Release 16); Jan. 2021, consisting of 185-pages.

ETSI TS 138 214 V16.4.0; Technical Specification; 5G; NR; Physical layer procedures for data (3GPP TS 38.214 version 16.4.0 Release 16); Jan. 2021, consisting of 173-pages.

3GPP TS 23.303 V16.0.0; 3rd Generation Partnership Project; Technical Specification Group Services and System Aspects; Proximity-based services (ProSe); Stage 2 (Release 16), Jul. 2020, consisting of 130-pages.

ETSI TS 133 303 V16.0.0; Technical Specification; Universal Mobile Telecommunications Systems (UMTS); LTE; Proximity-based Services (ProSe); Security Aspects (3GPP TS 33.303 version 16.0.0 Release 16); Aug. 2020, consisting of 92-pages.

* cited by examiner

300

400

500

TECHNIQUE FOR USING CHANNEL OCCUPANCY TIME

CROSS-REFERENCE TO RELATED APPLICATIONS

This application is a Submission Under 35 U.S.C. § 371 for U.S. National Stage Patent Application of International Application No.: PCT/SE2022/050457, filed May 10, 2022 entitled "TECHNIQUE FOR USING CHANNEL OCCUPANCY TIME," which claims priority to U.S. Provisional Application No. 63/186,244, filed May 10, 2021, entitled "TECHNIQUE FOR USING CHANNEL OCCUPANCY TIME," the entireties of both of which are incorporated herein by reference.

TECHNICAL FIELD

The present disclosure relates to a technique for using a channel occupancy time. More specifically, and without limitation, methods and devices are provided for radio communicating between a radio device and a network node using temporal radio resources associated with channel occupancy times.

BACKGROUND

The Third Generation partnership Project (3GPP) has specified techniques for radio communication between radio devices (e.g., user equipments, UEs) and network nodes (e.g., a gNB) of a radio access network on shared spectrum such as unlicensed spectrum. In Release 17, 3GPP agreed to have UE-initiated COT in addition to gNB-initiated COT. However, this may cause ambiguities as to which COT is to be used in the radio communication, e.g., since relevant time resources may overlap in time.

SUMMARY

Accordingly, there is a need for a radio communication technique that resolves ambiguities in the presence of channel occupancy times initiated by radio devices as well as network nodes.

A first method aspect relates to a method according to any one of Embodiments 1 to 38 or any of the enumerated embodiments 71 to 75, e.g., as to the radio device.

The first method aspect may be implemented alone or in combination with any one of the embodiments in the list of Embodiments, particularly the embodiments 1 to 38 and/or any one of the enumerated embodiments 71 to 75.

The first method aspect may be performed by the radio device. The radio device may be a user equipment (UE).

Embodiments of the technique may define, e.g., how to select a COT for transmission by the radio device, and/or how the network knows which COT of the radio device is being used, and/or an interaction between the first COT (e.g., UE-initiated COT) and other UEs.

The technique may be implemented as an extension of 3GPP In Release 16 (defining only gNB-initiated COT) and/or based on 3GPP Release 17 (defining UE-initiated COT as well on top of gNB-initiated COT). The embodiments can avoid confusion caused by this coexistence.

The embodiments can implement any one of the 4 sections (e.g. pertaining to 4 scenarios) of the 15 enumerated embodiments independently or in combination. Same or further embodiments can provide deterministic behavior due to multiple active COTs.

The technique may be implemented for interaction between UE-initiated COT and gNB-initiated COT.

The technique may be implemented based on or in extension of 3GPP RAN1 NR-U, e.g., according to 3GPP Release 17.

The technique may be applied for New Radio in unlicensed spectrum (NR-U), channel occupancy, frame-based equipment (FBE), and/or using idle period.

A second method aspect relates to a method according to any one of Embodiments 39 to 52.

The second method aspect may be implemented alone or in combination with any one of the embodiments in the list of Embodiments, particularly the embodiments 39 to 52 and/or any one of the enumerated embodiments 71 to 75.

The second method aspect may further comprise any feature and/or any step disclosed in the context of the first method aspect, or a feature and/or step corresponding thereto, e.g., a receiver counterpart to a transmitter feature or step.

The radio communication may depend on the determinations in accordance with rules (e.g., restrictions) that are defined for the radio device to select the second COT (e.g., a gNB-initiated COT) or the first COT (e.g., a UE-initiated COT) for the radio communication, e.g., a radio transmission.

Herein, any radio communication, transmission or reception may relate to a channel or carrier controlled (e.g., scheduled) by the network node.

Any embodiment may be implemented based on, or as an extension of, 3GPP document TS 38.213, version 16.4.0, and/or 3GPP document TS 38.214, version 16.4.0

The radio communicating may further relate to a sidelink (SL) between the radio device and another radio device.

At least for some method embodiments, the network node may be a relay radio device.

Without limitation, for example in a 3GPP implementation, any "radio device" may be a user equipment (UE).

The technique may be applied in the context of 3GPP New Radio (NR). Unlike a SL according to 3GPP LTE, a SL according to 3GPP NR can provide a wide range of QoS levels. Therefore, at least some embodiments of the technique can ensure that the relay radio appropriate for the QoS of the traffic is selected.

The technique may be implemented in accordance with a 3GPP specification, e.g., for 3GPP release 17. The technique may be implemented for 3GPP LTE or 3GPP NR according to a modification of the 3GPP document TS 23.303, version 16.0.0 or for 3GPP NR according to a modification of the 3GPP document TS 33.303, version 16.0.0.

The QoS indicated in the at least one control message may replace or modify existing rules for bearer selection. For example, for traffic that is unicasted in the UL, the relay radio device may use UL traffic flow templates (TFTs) to select UL bearers of an evolved packet system (EPS) for relayed UL packets independently from a ProSe Per Packet Priority applied over PC5 by remote radio devices, e.g., according to 3GPP document TS 23.303, version 16.0.0, clause 5.4.6.2. The at least one control message may comprise a control message transmitted from the relay radio device to the remote radio device, which is indicative of the QoS used according to the TFTs. Alternatively or in addition, the at least one control message may comprise a control message transmitted from the remote radio device to the relay radio device to, which is indicative of the QoS that overrules, e.g., a TFT-based selection.

For traffic that is unicasted in the DL, the relay radio device may map a QoS class identifier (QCI) of the EPS bearer into a ProSe Per-Packet Priority value to be applied for the DL relayed unicast packets over the interface PC5, e.g., according to 3GPP document TS 23.303, version 16.0.0, clause 5.4.6.2. The mapping rules may be provisioned in the relay radio device. The at least one control message may comprise a control message transmitted from the relay radio device to the remote radio device, which is indicative of the QoS used according to the QCI. Alternatively or in addition, the at least one control message may comprise a control message transmitted from the remote radio device to the relay radio device to, which is indicative of the QoS that overrules the QCI of the EPS bearer, e.g., by requesting a further EPS bearer.

In any radio access technology (RAT), the technique may be implemented for SL relay selection. The SL may be implemented using proximity services (ProSe), e.g. according to a 3GPP specification.

Any radio device may be a user equipment (UE), e.g., according to a 3GPP specification. The relay radio device may also be referred to as a relay UE (or briefly: relay). Alternatively or in addition, the remote radio device may also be referred to as a remote UE. Alternatively or in addition, the further radio device may also be referred to as a further UE.

The relay radio device and the RAN may be wirelessly connected in an uplink (UL) and/or a downlink (DL) through a Uu interface. Alternatively or in addition, the SL may enable a direct radio communication between proximal radio devices, e.g., the remote radio device and the relay radio device, optionally using a PC5 interface. Services provided using the SL or the PC5 interface may be referred to as proximity services (ProSe). Any radio device (e.g., the remote radio device and/or the relay radio device and/or the further radio device) supporting a SL may be referred to as ProSe-enabled radio device.

The relay radio device may also be referred to as ProSe UE-to-Network Relay.

The remote radio device and/or the relay radio device and/or the RAN and/or the further remote radio device may form, or may be part of, a radio network, e.g., according to the Third Generation Partnership Project (3GPP) or according to the standard family IEEE 802.11 (Wi-Fi). The first method aspect, the second method aspect and third method aspect may be performed by one or more embodiments of the remote radio device, the relay radio device and the RAN (e.g., a base station) or the further remote radio device, respectively.

The RAN may comprise one or more base stations, e.g., performing the third method aspect. Alternatively or in addition, the radio network may be a vehicular, ad hoc and/or mesh network comprising two or more radio devices, e.g., acting as the remote radio device and/or the relay radio device and/or the further remote radio device.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Whenever referring to the RAN, the RAN may be implemented by one or more base stations (as examples of the network node).

The radio device may be wirelessly connected or connectable (e.g., according to a radio resource control, RRC, state or active mode) with the relay radio device and, optionally, at least one base station of the RAN.

The base station may encompass any station that is configured to provide radio access to any of the radio devices. The base stations may also be referred to as cell, transmission and reception point (TRP), radio access node or access point (AP). The base station and/or the relay radio device may provide a data link to a host computer providing the user data to the remote radio device or gathering user data from the remote radio device. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer, a packet data convergence protocol (PDCP) layer, and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

A first device aspect relates to a device (e.g., radio device or UE) according to any one of Embodiments 54 to 59. The device may be configured to perform any one of the steps of the first method aspect.

A second device aspect relates to a device (e.g., network node or base station) according to any one of Embodiments 54 to 59. The device may be configured to perform any one of the steps of the first method aspect.

As to a still further aspect a communication system including a host computer is provided. The host computer comprises a processing circuitry configured to provide user data, e.g., included in the first and/or second data of the multi-layer transmission. The host computer further comprises a communication interface configured to forward the first and/or second data to a cellular network (e.g., the RAN and/or the base station) for transmission to a UE. A processing circuitry of the cellular network is configured to execute any one of the steps of the first and/or second method aspects. The UE comprises a radio interface and processing circuitry, which is configured to execute any one of the steps of the first and/or second method aspects.

The communication system may further include the UE. Alternatively, or in addition, the cellular network may further include one or more base stations configured for radio communication with the UE and/or to provide a data link between the UE and the host computer using the first and/or second method aspects.

The processing circuitry of the host computer may be configured to execute a host application, thereby providing the first and/or second data and/or any host computer functionality described herein. Alternatively, or in addition, the processing circuitry of the UE may be configured to execute a client application associated with the host application.

Any one of the devices, the UE, the base station, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as MulteFire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
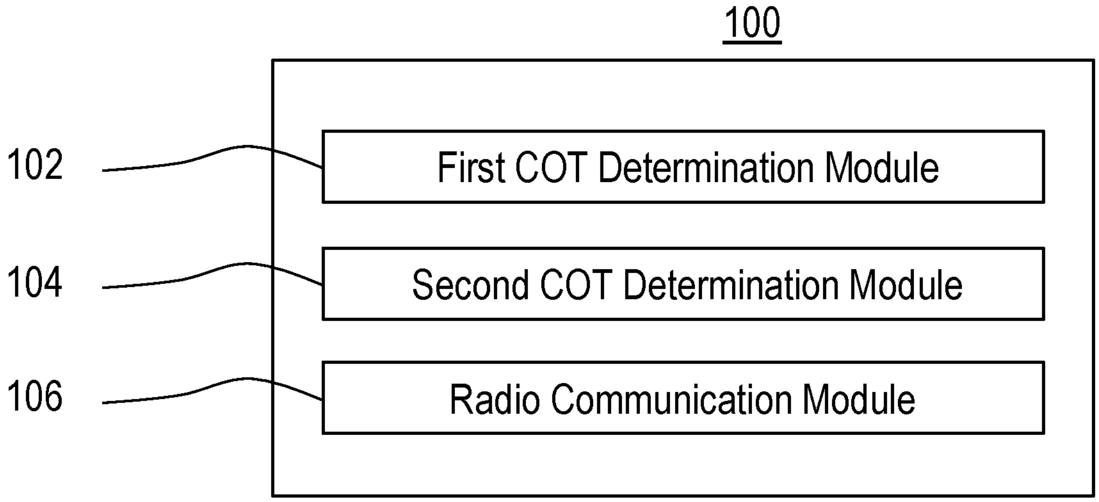
FIG. 1 shows a schematic block diagram of an embodiment of a device for radio communicating with a network node.

FIG. 1 schematically illustrates a block diagram of an embodiment of a first device for radio communicating between a radio device and a network node of a radio access network (RAN) using a temporal radio resource associated with a channel occupancy time (COT). The first device is generically referred to by reference sign 100.

The first device 100 comprises first COT determination module 102 for determining if (e.g., that or whether) a first COT is (e.g., has been) initiated by the radio device.

The first device 100 further comprises second COT determination module 104 for determining if (e.g., that or whether) a second COT is (e.g., has been) initiated by the network node.

The first device 100 further comprises a radio communication module 106 which may communicate with the network node and/or another radio device in the temporal radio resource associated with the first COT or the second COT depending on the determinations.

Any of the modules of the first device 100 may be implemented by units configured to provide the corresponding functionality.

The first device 100 may also be referred to as, or may be embodied by, the radio device (or briefly: UE). The UE 100 and the network node may be in direct radio communication, e.g., at least for one of the modules. The network node may be embodied by a second device 200.

Figure 2:
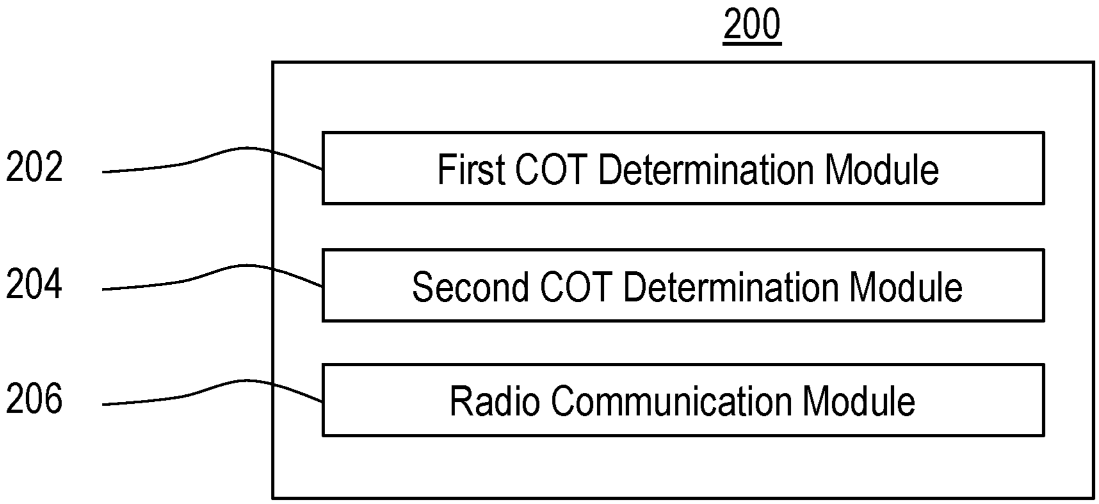
FIG. 2 shows a schematic block diagram of an embodiment of a device for radio communicating with a radio device.

FIG. 2 schematically illustrates a block diagram of an embodiment of a device for radio communicating between a radio device and a network node of a radio access network (RAN) using a temporal radio resource associated with a channel occupancy time (COT). The second device is generically referred to by reference sign 200.

The second device 200 comprises first COT determination module 202 for determining if (e.g., that or whether) a first COT is (e.g., has been) initiated by the radio device.

The second device 200 further comprises second COT determination module 204 for determining if (e.g., that or whether) a second COT is (e.g., has been) initiated by the network node.

The second device 200 further comprises a radio communication module 206 which may communicate with the radio device and/or another radio device in the temporal radio resource associated with the first COT or the second COT depending on the determinations. Thus, the radio communication module 206 of the network node 200 may communicate with the radio device 100 and/or another radio device in the temporal radio resource associated with the first COT or the second COT depending on the determinations.

Any of the modules of the second device 200 may be implemented by units configured to provide the corresponding functionality.

The second device 200 may also be referred to as, or may be embodied by, the network node (e.g., a base station such as a gNB). The network node 200 and the radio device (or briefly: UE) 100 may be in direct radio communication, e.g., at least for one of the modules. The radio device may be embodied by the first device 100.

Figure 3:
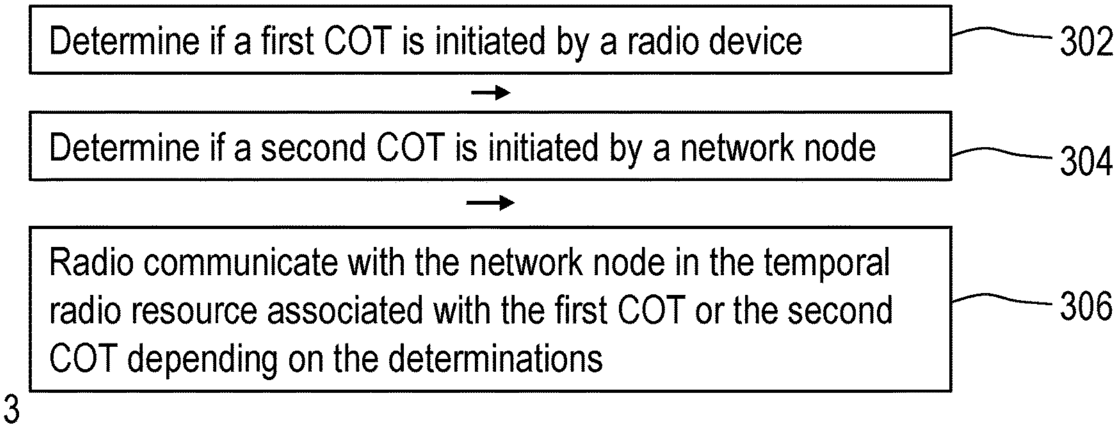
FIG. 3 shows a flowchart for a method of radio communicating with a network node, which method may be implementable by the device of FIG. 1.

FIG. 3 shows an example flowchart for a method 300 according to the first method aspect and/or any one of the Embodiments 1 to 38. The method 300 is a method of radio communicating between the radio device 100 and the network node 200 of the RAN, using a temporal radio resource associated with a COT. The method 300 is performed by the radio device 100 and comprises or initiates at least one of the following steps.

302

The radio device 100 determines if a first COT is initiated by the radio device 100.

304

The radio device 100 determines if a second COT is initiated by the network node 200.

306

The radio device 100 radio communicates with the network node 200 in the temporal radio resource associated with the first COT or the second COT depending on the determinations.

The determinations may relate to a result of the step of determining if the first COT is initiated by the radio device and a result of the step of determining if the second COT is initiated by the network node.

The method 300 may be performed by the first device 100. For example, the modules 102, 104 and 106 may perform the steps 302, 304 and 306, respectively.

Figure 4:
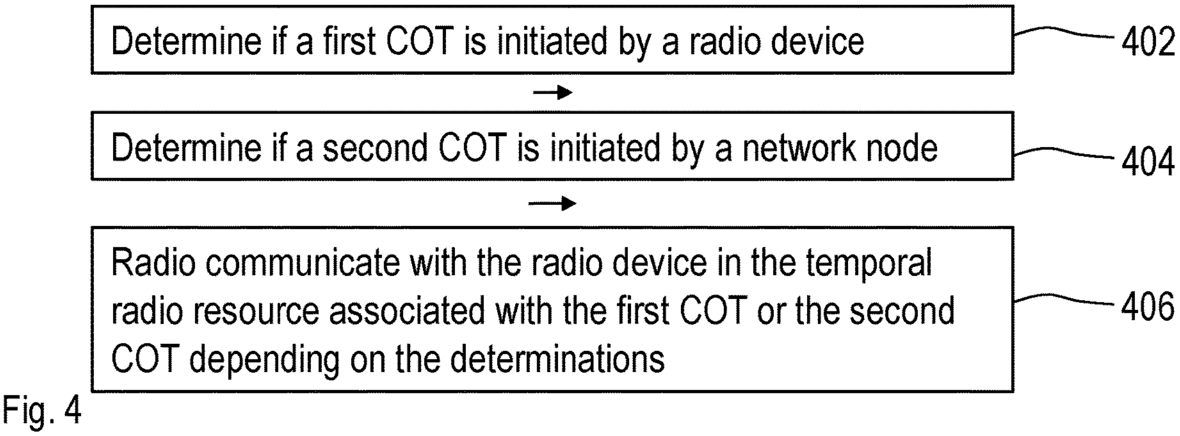
FIG. 4 shows a flowchart for a method of radio communicating with a radio device, which method may be implementable by the device of FIG. 2.

FIG. 4 shows an example flowchart for a method 300 according to the first method aspect and/or any one of the Embodiments 39 to 52. The method 400 is a method of radio communicating between the radio device 100 and the network node 200 of the RAN using a temporal radio resource associated with the COT. The method 400, performed by the network node 200, comprises or initiates at least one of the following steps.

402

The network node 200 determines if a first COT is initiated by the radio device 100.

404

The network node 200 determines if a second COT is initiated by the network node 200.

406

The network node 200 radio communicates with the radio device 100 in the temporal radio resource associated with the first COT or the second COT depending on the determinations.

The determinations may relate to a result of the step of determining if the first COT is initiated by the radio device and a result of the step of determining if the second COT is initiated by the network node.

The method 400 may be performed by the second device 200. For example, the modules 202, 204 and 206 may perform the steps 402, 404 and 406, respectively.

In any aspect, the technique may be applied to uplink (UL), downlink (DL) or direct communications between radio devices, e.g., device-to-device (D2D) communications or sidelink (SL) communications.

Each of the radio device 100 and network node 200 may be a radio device or a base station. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

Herein, whenever referring to noise or a signal-to-noise ratio (SNR), a corresponding step, feature or effect is also disclosed for noise and/or interference or a signal-to-interference-and-noise ratio (SINR).

Any of the embodiments may implement URLLC.

Ultra-reliable and low latency communication (URLLC) is one of the main use cases of 5G new radio (NR). URLLC has strict requirements on transmission reliability and latency, i.e., 99.9999% reliability within 1 ms one-way latency. In NR Rel-15, several new features and enhancements were introduced to support these requirements. In Rel-16, standardization works are focused on further enhancing URLLC system performance as well as ensuring reliable and efficient coexistence of URLLC and other NR use cases. One example scenario is when both enhanced mobile broadband (eMBB) and URLLC UEs co-exist in the same cell. Here, mainly two approaches have been identified to support multiplexing/prioritization.

Any of the embodiments may implement NR-U.

In addition to operation in licensed bands, NR has been enhanced in 3GPP Rel-16 (RP-190706, Revised WID on NR-based Access to Unlicensed Spectrum) to allow operation in unlicensed bands, i.e., NR-unlicensed (NR-U). Allowing unlicensed networks, i.e., networks that operate in unlicensed or shared spectrum to effectively use the available spectrum is an attractive approach to increase system capacity. For convenience, we will in the following only mention unlicensed spectrum to refer to both unlicensed and shared spectrum.

Although it is more challenging to match the qualities of the licensed regime on unlicensed spectrum, solutions that allow an efficient use of it as a complement to licensed deployments have the potential to bring great value to the 3GPP operators, and, ultimately, to the 3GPP industry as a whole. Some features in NR need to be adapted to comply with the special characteristics of the unlicensed band as well as also different regulations. Further, if a UE intended to use unlicensed spectrum, it may employ Clear Channel Assessment (CCA) schemes to find out whether the channel is free or not over a certain period. One such technique is Listen Before Talk (LBT). There are many different flavors of LBT, depending on which channel access mode the device uses and which type of data it wants to transmit in the upcoming transmission opportunity, referred to as channel occupancy time (COT). Common for all flavors is that the sensing is done in a particular channel (corresponding to a defined carrier frequency) and over a predefined bandwidth. Further, two modes of access operations are defined-Frame-Based Equipment (FBE) and Load-Based Equipment (LBE). In FBE mode, the sensing period is simple, while the sensing scheme in LBE mode is more complex.

Any of the embodiments may implement semi-static channel occupancy (e.g., FBE mode access operations).

Figure 5:
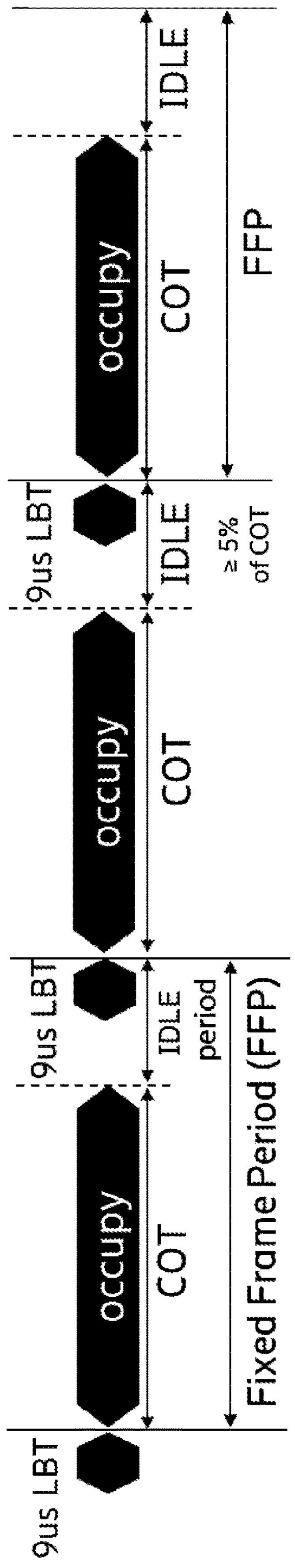
FIG. 5 schematically illustrates examples channel occupancy times and associated idle periods in fixed frame periods usable by embodiments of the devices of FIGS. 1 and 2 for performing the methods of FIGS. 3 and 4, respectively.

In FBE mode as defined in 3GPP Rel-16 and illustrated in FIG. 5, the gNB assigns Fixed Frame Periods (FFPs), senses the channel for 9 μs (9 microseconds) just before the FFP boundary, and if the channel is sensed to be free, it starts with a downlink transmission. With the DL transmission at the beginning of an FFP, the gNB has initiated a COT during that FFP. The gNB can share this COT with UEs for uplink transmissions configured or scheduled for the UEs or other DL transmissions. If the gap between consecutive transmissions are more than 16 μs (16 microseconds), a 9 μs (9 microseconds) successful sensing is required before a transmission in the COT.

In each FFP, DL/UL transmissions are only allowed within a subset of time resources of the FFP, wherein the remaining time at the end of the FFP is reserved so that other nodes also have the chance to sense and utilize the channel. The reserved time at the end of each FFP is referred to as idle period.

This procedure can be repeated with a certain periodicity. Hence in FBE operations, the channel is sensed at specific intervals just before the FFP boundary. The FFP can be set to values between 1 and 10 ms and can be changed after a minimum of 200 ms. The IDLE period is a regulatory requirement and is supposed to be at least $T_{IDLE} \geq \max(0.05*\mathrm{COT}, 100\ \mu s)$. In 3GPP TS 37.213 this has been simplified to be $T_{IDLE} \geq \max(0.05*\mathrm{FFP}, 100\ \mu s)$, i.e. the maximum channel occupancy time, MCOT, would be defined as $T_{MCOT} = \min(0.95*\mathrm{FFP}, \mathrm{FFP}-0.1\ \mathrm{ms})$. So for 10 ms FFP, the MCOT would be 9.5 ms, while for 1 ms FFP the MCOT would be 0.9 ms=0.9*FFP.

FIG. 5 schematically illustrates an example of FBE procedure depicting 3GPP semi-static channel occupancy, e.g., according to ETSI harmonized standard EN 301 893 Section 4.2.7.3.1.

The FBE mode supported in Rel-16 is referred to as "gNB-initiated COT", wherein a DL transmission at the beginning of an FFP determines that the FFP before the corresponding idle period can be used by gNB and UE to DL and UL transmissions, respectively. In this manner, gNB is "initiating" the COT and UEs are "sharing" the COT that is initiated by gNB.

In Rel-17, 3GPP supports "UE-initiated COT" in addition to gNB-initiated COT. The details of the procedure is under discussion while the same principle as gNB initiated COT is applicable. That implies that a UE would be associated with an FFB that might be same or different from the gNB FFP. If the UE transmits a UL transmission at the beginning of FFP after successfully sensing the channel for 9 μs (9 microseconds), the UE has initiated a COT in that the FFP can be shared with the gNB.

Any of the embodiments may implement a dynamic channel occupancy (LBE mode).

The default LBT mechanism for LBE operation, LBT category 4, is similar to existing Wi-Fi operation, where a node can sense the channel at any time and start transmitting if the channel is free after a deferral and backoff period. For specific cases, e.g. shared COT, other LBT categories allowing a very short sensing period, are allowed.

Any of the embodiments may implement LBT channels in wideband operation mode.

There are different wideband operation modes. The nodes perform LBT on a certain bandwidth referred to as LBT channel, which are up to 20 MHz. The transmission bandwidth is therefore also limited by the LBT bandwidth. The channels can however be aggregated in wideband operation modes using either carrier aggregation or using one wideband carrier which is divided into several so-called resource block sets, RB set (also referred to as LBT bandwidth or LBT subband). In either modes the LBT can be performed according to one of the following procedures: (1) independent CAT4 LBT on each of the carriers, (2) on primary carrier performs CAT4 LBT, and sensing for a fixed CCA on the remaining carries just before the end of the CAT4 LBT on the primary carrier.

Any of the embodiments may implement a Configured Grant (CG), e.g., in NR-U.

a Brief Description of Configured Grant in NR-U

Same as in NR, a UE in NR-Unlicensed (NR-U) can be semi-statically scheduled for uplink transmission based on Type 1 or Type 2 configured grant. There have been specific enhancements in configured grant related to time-domain resource allocation, configured grant Uplink Control Information (CG-UCI), and autonomous uplink (AUL) transmission.

CG Re-Transmission Timer

In NR-U a new timer is introduced named as CG retransmission timer (CGRT). This timer can be used for autonomous uplink transmission (AUL). There is also another timer configuredGrantTimer (CGT). CGT limits maximum AUL retransmission attempts for a HARQ process. When the CGT expires the UE should flush the HARQ buffer for this HARQ process and transmit new data associated to it (e.g., associated to the HARQ process).

Figure 6:
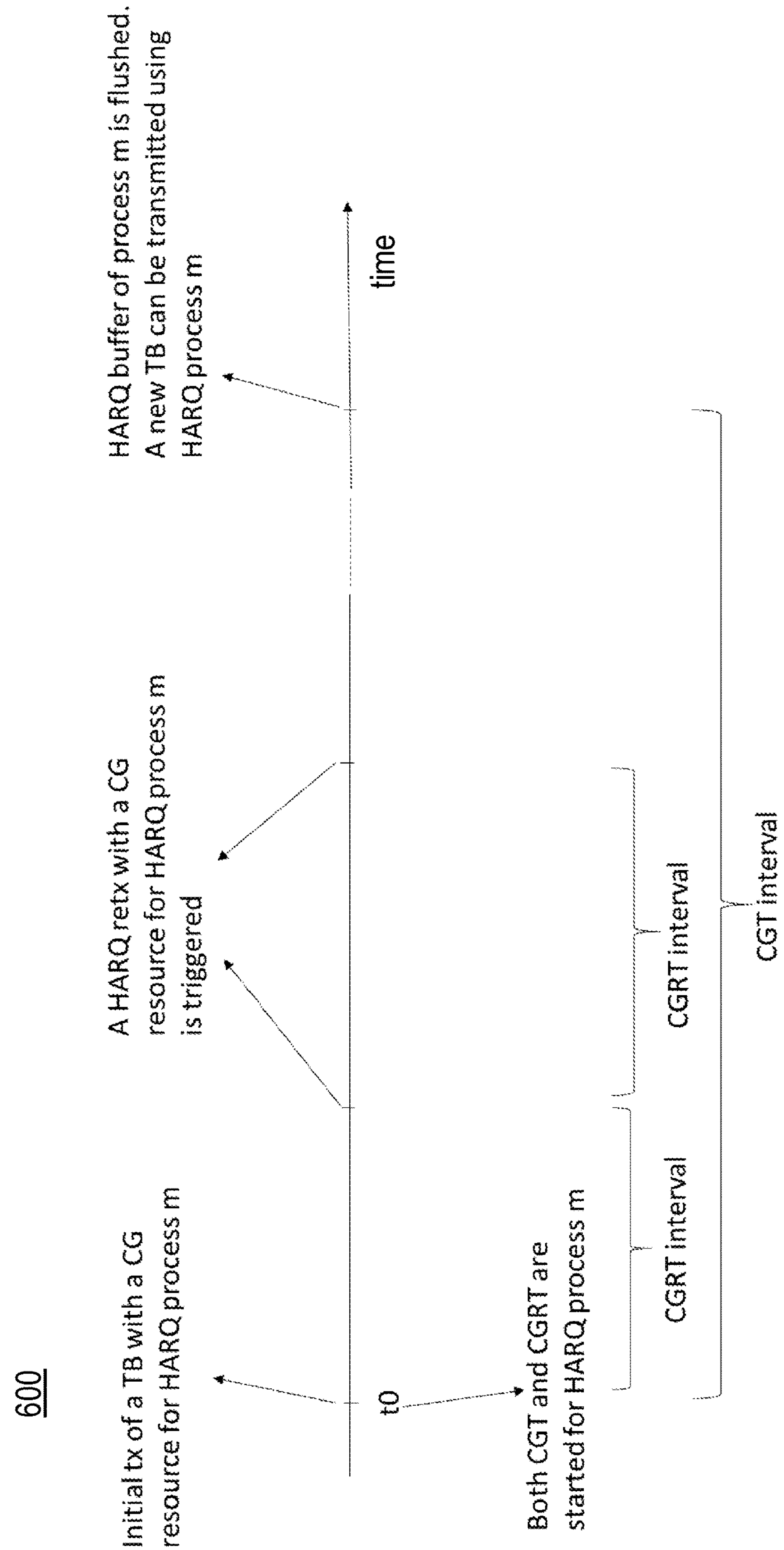
FIG. 6 schematically illustrates examples of transmissions according to a configured grant usable by embodiments of the devices of FIGS. 1 and 2 for performing the methods of FIGS. 3 and 4, respectively.

FIG. 6 schematically illustrates a timeline for simultaneously starting a CG timer (CGT) and a CG re-transmission timer (CGRT).

As stated in 3GPP document TS 38.321, version 16.3.0, clause 5.8.2, there are three types of transmission without dynamic grant:

- for a configured grant Type 1, an uplink grant is provided by RRC, and stored as configured uplink grant;
- for a configured grant Type 2, an uplink grant is provided by PDCCH, and stored or cleared as configured uplink grant based on L1 signalling indicating configured uplink grant activation or deactivation;

retransmissions on a stored configured uplink grant of Type 1 or Type 2 configured with cg-Retransmission-Timer (e.g., triggered by expiry of the cg-RetransmissionTimer).

The 3GPP document TS 38.321, version 16.0.0, specifies: "For configured uplink grants neither configured with harq-ProcID-Offset2 nor with cg-RetransmissionTimer, the HARQ Process ID associated with the first symbol of a UL transmission is derived from the following equation:

HARQ Process ID=[floor(CURRENT_symbol/periodicity)]modulo nrofHARQ-Processes

For configured uplink grants with harq-ProcID-Offset2, the HARQ Process ID associated with the first symbol of a UL transmission is derived from the following equation:

$$HARQ \text{ Process } ID = [\text{floor}(\text{CURRENT\_symbol}/\text{periodicity})] \text{ modulo } nrofHARQ\text{-}Processes + harq\text{-}ProcID\text{-}Offset2$$

wherein $$\text{CURRENT\_symbol} = (SFN \times numberOfSlotsPerFrame \times numberOfSymbolsPerSlot + \text{slot number in the frame} \times numberOfSymbolsPerSlot + \text{symbol number in the slot}),$$

and numberOfSlotsPerFrame and numberOfSymbolsPerSlot refer to the number of consecutive slots per frame and the number of consecutive symbols per slot, respectively as specified in 3GPP document TS 38.211, version 16.4.0.

For configured uplink grants configured with cg-RetransmissionTimer, the UE implementation select an HARQ Process ID among the HARQ process IDs available for the configured grant configuration. The UE shall prioritize retransmissions before initial transmissions. The UE shall toggle the New Data Indicator (NDI) in the CG-UCI for new transmissions and not toggle the NDI in the CG-UCI in retransmissions."

Clause 5.4.2.1 in 3GPP document TS 38.321, version 16.0.0, specifies:

For configured uplink grants configured with cg-RetransmissionTimer, the redundancy version zero is used for initial transmissions and UE implementation selects redundancy version for retransmissions.

CG-UCI

CG-UCI is included in every CG-PUSCH transmission and includes the information listed in below Table 1. CG-UCI is mapped as per rules of Release 15 with CG-UCI having the highest priority. It is mapped on the symbols starting after first Demodulation Reference Signal (DMRS) symbol. To determine the number of Resource Elements (REs) used for CG-UCI, the mechanism of beta-offset in Release 15 of NR for HARQ-ACK on CG-PUSCH is reused. Nonetheless, a new (e.g., CG-UCI-specific) RRC-configured beta-offset for CG-UCI is defined.

TABLE 1

| CG-UCI content<br>UCI content |
|---|
| HARQ |
| RV |
| NDI |
| COT sharing information |
| CRC |

If CG-PUSCH resources overlap with PUCCH carrying CSI-part 1 and/or CSI-part 2, the later can be sent on CG-PUSCH. RRC configuration can be provided to the UE indicating whether to multiplex CG-UCI and HARQ-ACK. If configured, in the case of PUCCH overlapping with one or more CG-PUSCHs within a PUCCH group, the CG-UCI and HARQ-ACK are jointly encoded as one UCI type.

Otherwise, configured grant PUSCH is skipped if CG-PUSCH overlaps with PUCCH that carries HARQ ACK feedback.

Downlink Feedback Information (DFI)

To reduce the signaling overhead corresponding to explicit feedback transmission, NR-U supports an enhanced DCI format 0_1 for indicating downlink feedback information ("CG-DFI"), that carry HARQ-ACK bitmap for all UL HARQ processes from the same UE. Additionally, the gNB may trigger an adaptive retransmission using a dynamic grant.

In section 6.1 of the 3GPP document TS 38.214, version 16.1.0, it is stated that "If a UE receives an ACK for a given HARQ process in CG-DFI in a PDCCH ending in symbol i to terminate a transport block repetition in a PUSCH transmission on a given serving cell with the same HARQ process after symbol i, the UE is expected to terminate the repetition of the transport block in a PUSCH transmission starting from a symbol j if the gap between the end of PDCCH of symbol i and the start of the PUSCH transmission in symbol j is equal to or more than N2 symbols. The value N2 in symbols is determined according to the UE processing capability defined in Clause 6.4, and N2 and the symbol duration are based on the minimum of the subcarrier spacing corresponding to the PUSCH and the subcarrier spacing of the PDCCH indicating CG-DFI."

Any of the embodiments may implement a DL pre-emption in NR.

Once DL URLLC data appears in a buffer, a base station should choose the earliest moment of time when resources can be normally allocated without colliding with the resources allocated for an already ongoing downlink transmission for the corresponding UE. This may be either in the beginning of the slot or a mini-slot where the mini-slot can start at any OFDM symbol.

Hence, downlink pre-emption may happen when one or more long-term allocations (e.g., based on a slot) occupy resources (particularly, wideband resources) and there is no room for URLLC data transmission, typically supported using a mini-slot. In this case a scheduler can send DCI to the UE for which the URLLC data is intended and thereby inform the UE that an override (pre-emption) has been triggered for the ongoing transmission in downlink. When an enhanced Mobile Broadband (eMBB) DL transmission is pre-empted, the pre-empted part of the original message pollutes the soft buffer (only noise and/or interference is received or are represented by the buffer). It is therefore important (though not required by the standard) to flush the affected bits from the soft buffer to increase the decodability of the eMBB data at the UE. If not, the pre-empted bits may negatively impact decoding in retransmissions, which will likely happen. According to Release 15, a DCI-based indication of the DL pre-emption may be explicitly signaled, which is carried either:

(Option 1) by special DCI format 2_1 over group common PDCCH (3GPP document TS 38.213, version 16.4.0, clause 7.3.1.3.2 and clarified, section 11.2 "Discontinuous transmission indication") or;

(Option 2) by special flag in multi-CBG retransmission DCI "CBG flushing out information" (3GPP document TS 38.213, version 16.4.0, section 7.3.1.2—DCI formats for scheduling of PDSCH).

Option 1 gives an indication as a 14-bit bitmap, which addresses reference downlink resource domains in between two pre-emption indication (PI) messages. The reference resource is configured by RRC, wherein the highest resolution of this signaling in time is 1 OFDM symbol and in frequency is half of the BWP (BandWidth Part), but not at the same time. The longer the periodicity of messages, the coarser the resolution. The group common DCI format 2_1 indicates which part of the configured reference resource is preempted. Since this is a group common signaling, all UEs within the BWP may read it.

Option 2 is a user specific way of signaling. The HARQ retransmission DCI, which contains a set of code block (CB) and/or code block groups (CBGs), may have a special bit to indicate that the UE must overwrite existing bits in the soft buffer (e.g., to not combine) by soft bits of retransmitted CB and/or CBGs. In this case gNB is responsible for determination of subset of CB and/or CBGs which needs to be flushed before the soft-combining process. The Option 2 is not further discussed for the subject technique.

Any of the embodiments may implement UL Cancellation in NR.

In Release 16, two methods are adopted to enable inter-UE UL cancellation (which is also referred to as pre-emption) in NR.

The first method is based on power control to increase the power of the URLLC to make it more resilient to interference from the one or more eMBB users. Additional power control for release 16 UEs are specified in 3GPP document TS 38.213, version 16.4.0, clause 7.1.1. The main advantage with this option is that it does not require any changes in the behavior of the eMBB UE, hence it works with Release 15 UEs. One disadvantage is that to guarantee the performance of the URLLC UE while being interfered by eMBB traffic, the transmit power spectral density (PSD) may have to be increased significantly which can cause interference to other cells. Also, UEs not in the close vicinity of the base station may not have the power budget to do this increase and will therefore experience much lower Signal to Interference and Noise Ratio (SINR) than the required.

The second method is based on a cancellation indicator being transmitted from the base station to the interfering eMBB UEs. When a URLLC UE is scheduled on time and/or frequency resources that are already scheduled to a lower priority eMBB UE, the base station can transmit a cancellation indicator to the eMBB UE. Upon reception of this indicator the eMBB UE will avoid transmitting on a set of indicated resources. The details of the cancellation indicator and the UE behavior upon reception of this signal is specified in 3GPP document TS 38.213, version 16.4.0.

The mechanism for UL cancellation indication (CI) includes a reference time-frequency region that is configured for the UE by radio resource configuration or control (RRC) signaling, and a downlink control information (DCI) that indicates parts of the configured resources within which the transmission should be cancelled. The reference time-frequency region is also referred to as reference resource (RR). The size of the cancellation indication DCI as well as the time domain granularity are configurable. The frequency domain granularity can then be determined from the total bit field size and the time domain granularity.

A typical use case for this is when eMBB traffic is scheduled in a whole slot and all PRBs and time sensitive URLLC needs to be transmitted. Here, time sensitive means that it requires instant access to the channel and waiting until the next slot before transmission will introduce too much delay. In NR, URLLC traffic may be scheduled on one or a few OFDM symbols and with a significantly shorter time from the uplink grant to when the uplink transmission takes place. This means that eMBB users may already have been scheduled on all available time and/or frequency resources. With the cancellation indicator, the gNB can choose to cancel the eMBB traffic and hence reduce the interference to the URLLC UE.

Any of the embodiments may implement DCI formats. DCI formats a described in 3GPP document TS 38.213, version 16.4.0

Any of the embodiments may implement or use the following assumption:

The term COT is used often for FFP for simplicity. For example, if we say COT has idle period, it means FFP has idle period because FFP consists of COT and idle period, see FIG. 5 gNB COT means gNB initiated COT

UE COT means UE initiated COT

The technique may be implemented according to at least one of the following enumerated embodiments 1 to 15 and/or according to at least one of the embodiments defined by the list of Embodiments.

Section A: Transmission Restrictions in Idle Periods of Multiple Active COTs

1. In one embodiment, if there is a scenario where UE 100 has initiated its own COT and gNB 200 has its own COT, then there are two types of idle period which the UE/gNB may seek to transmit in or not (i.e., restrictions can be applied). One idle period belongs to gNB COT and another period is part of UE COT. So, the following "restriction options" may be defined, wherein different nodes can be restricted in different idle period types, which are
   a. UE 100 cannot transmit in gNB 200 COT's idle period where UE 100 has initiated its own COT
   b. UE 100 may transmit in gNB 200 COT's idle period where UE 100 has initiated its own COT
   c. gNB 200 cannot transmit in UE 100 COT's idle period where the gNB 200 has initiated its COT
   d. gNB 200 may transmit in UE 100 COT's idle period where the gNB 200 has initiated its COT
   e. Combination a and c
   f. Combination a and d
   g. Combination b and c
   h. Combination b and d
2. In embodiment 1, non-limiting options for the transmission restriction on idle periods of different COTs were defined. These options may be indicated to the UE 100 by following ways
   a. Select option via RRC
   b. Select option via DCI
      i. Examples of DCI is scheduling DCI, unicast DCI, group-common DCI or some new DCI ii. gNB 200 can define options in some RRC table and DCI can indicate the option (indicating the row in RRC table) which is to be enabled or disabled.

3. Elaborating on Embodiment 2, option b, the restrictions (options in Embodiment 1) may be indicated as following ways
   a. The restriction may be indicated in scheduling DCI for PUSCH
      i. In one example, the existing fields, e.g., Channel Access Type, the CP extension fields in formats e.g., DCI 0_0, 0_1 can be used to indicate the transmission restriction options
      ii. In one option, new fields can be introduced to indicate restriction options in, e.g., DCI format 0_0, 0_1, 0_2, etc.

Further to elaborating on Embodiments 1&2, in general, and Embodiment 2, option b, in particular, some embodiments disclosed herein are directed to different options/ways to indicate whether UL transmission is in UE-COT (UE-initiated COT) or gNB-COT (gNB-initiated COT). Further details of these embodiments are disclosed in Section E.

b. The restriction options may be indicated via group-common DCI
      i. In one example, the existing fields, e.g., COT duration indicator in DCI format 2_0 can be used to indicate the transmission restriction options
      ii. In one option, new fields may be introduced in format 2_0 to indicate restriction options
      iii. In one option, new fields may be introduced in cancellation DCI, e.g., format 2_4 to indicate restriction options
      iv. Traditionally, group-common DCI format 2_4 indicates reference resource over which any UL transmission is to be cancelled. In one option, this behavior can be emulated, where the gNB 200 may indicate reference resource (corresponding to idle periods of gNB COT or some UE COT) over which user group applies indicated restriction options. For example, gNB 200 indicates some reference resource corresponding to idle periods with restriction option 1-a, it means the UEs in the cell cannot transmit in gNB's idle period if Ues' have their own initiated COTs.
   c. The restriction options may be indicated in DCI for certain COT configurations (it may be UE COT or gNB COT).
      a. For example, if the gNB 200 has two gNB COT configurations, say gNB COT ID #X1 and gNB COT ID #X2, then the gNB 200 can tell the UE 100, implement option 1-a with gNB COT ID #X1, which means the UE 100 will not transmit in gNB FFP ID's X1's idle periods but there is no such restriction for gNB FFP ID's X2.
4. In one embodiment 1, some restriction options were laid, but there may be additional parameters/information on time period or resource over which these restrictions are applied. For example, if gNB 200 indicates option 1-a, then for what time or what or how many idle periods, etc., the restriction is valid. In scheduling DCI or Group-common DCI, gNB 200 may indicate this in following ways
   a. Resources or Reference resources: Resources over which restrictions are applied. The resources correspond to idle period(s) of known COT configurations. This is a bit similar to DCI format 2_4 working where it indicates reference resource indicating the UL cancellation over it. There may be many flavors to indicate the 'idle period' resource, one example is to indicate the resource or reference resource of the selected idle periods, e.g., if gNB 200 indicates option 1-a, it may mention, e.g., resources correspond to idle periods in gNB COT period, n, n+1, n+7, n+8, e.g., as illustrated at reference signs 702, or analogously for UE COT periods at reference signs 704). For e.g., based on scenario depicted FIG. 7, if gNB 200 indicates option 1-a, and gNB 200 wants UE 100 not to transmit in first and last gNB's FFP's idle period in the figure (there are 4 idle periods in gNB FFP depicted in the figure) then gNB 200 indicates idle period resources, e.g., label 1, 2, 33, 34, 35, 36 at reference signs 706.
      i. In another option, gNB 200 may mention resources or reference resources, where if there is an idle period over these indicated (reference) resources, the notified restriction option is applied. Otherwise, if there are no idle period over these reference resources, then UE 100 may ignore it, see FIG. 7. If in the scenario of FIG. 7, gNB 200 indicates option 1-a, and wants that UE 100 not to transmit in first three gNB FFP's idle periods in the figure, then it may indicate staring resource label and end resource label, i.e., label 1 and label 24 (corresponding to first three gNB FFP's idle periods), and UE 100 will not transmit in label 1, 2, 11, 12, 13, 14, 23, 24 as they intersect with gNB FFP's idle period
   b. Time span: In this example, gNB 200 may mention, resources or reference resources in the form of time information, e.g., from a time instant t1 to t2, then the restriction is applied for all idle periods of a given COT configuration within the span. This is a bit similar to 4-a-i option above.
   c. COT period number: In this example, gNB 200 may mention, e.g., (a) COT/FFP period, n, n+1, n+7, n+8 or (b) COT/FFP period, n to m, for which the restriction is applied in their associated idle periods, if gNB 200 indicates option 1-a, then UE 100 cannot transmit in gNB's COT's idle period for the mentioned COT periods.

Figure 7:
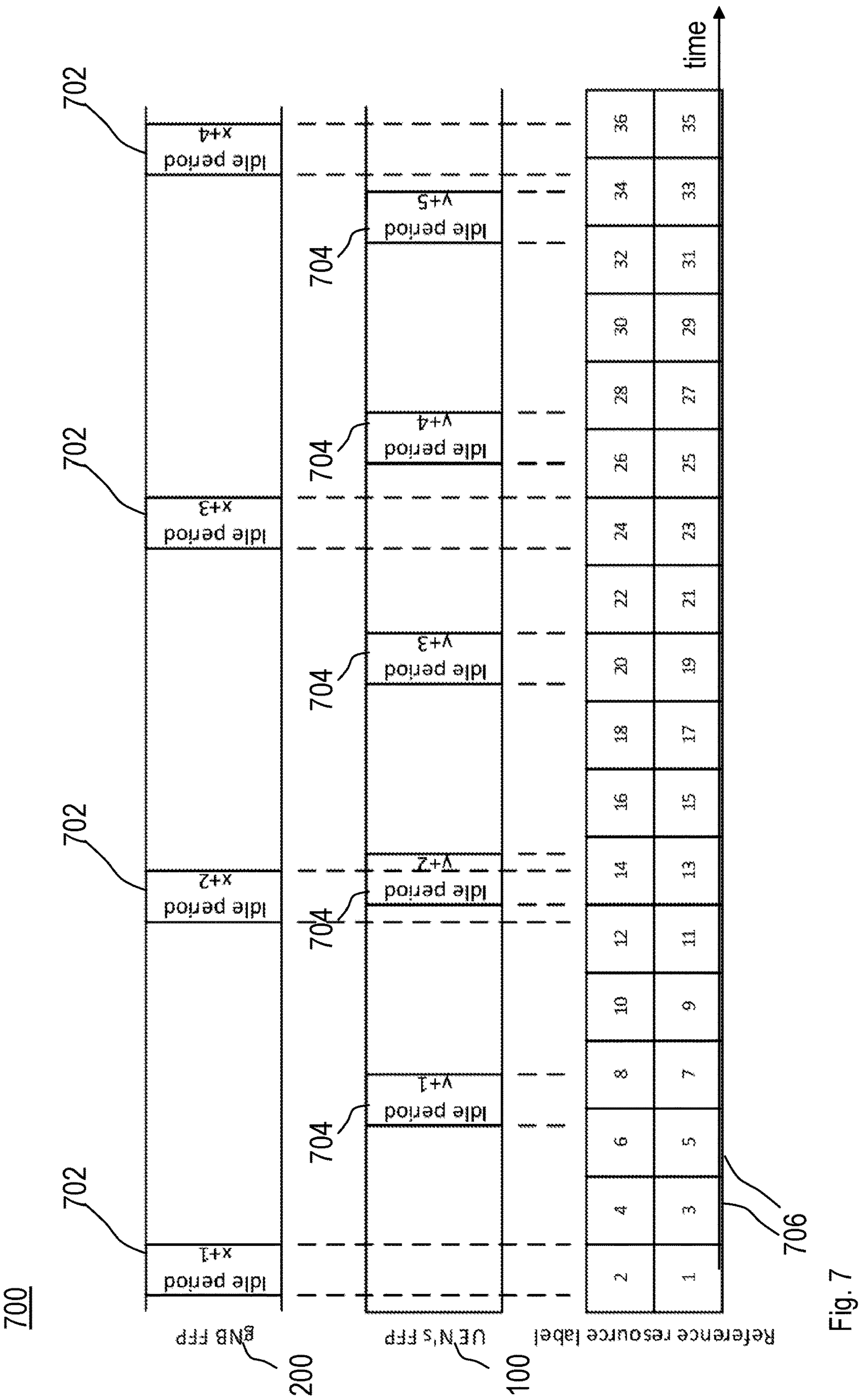
FIG. 7 schematically illustrates an example of overlapping idle periods associated with channel occupancy times initiated by embodiments of the devices of FIGS. 1 and 2 for performing the methods of FIGS. 3 and 4, respectively.

FIG. 7 shows a diagram 700 schematically illustrating temporal radio resources 702, 704, and/or 706, which can be associated or are associated with at least one of the first COT initiated by the radio device 100 (e.g., in the second row) and/or the second COT initiated by the network node 200 (e.g., in the first row). The respective temporal radio resource is labeled. The label to resource mapping may be provided in RRC configuration.

The network node 200 (e.g., a gNB) may indicate at least one label for various idle periods, over which it can impose the at least one restriction for the one or more radio devices (e.g., UEs).

Section B: Remaining COT Information Using gNB's Group-Common Transmission

Figure 8:
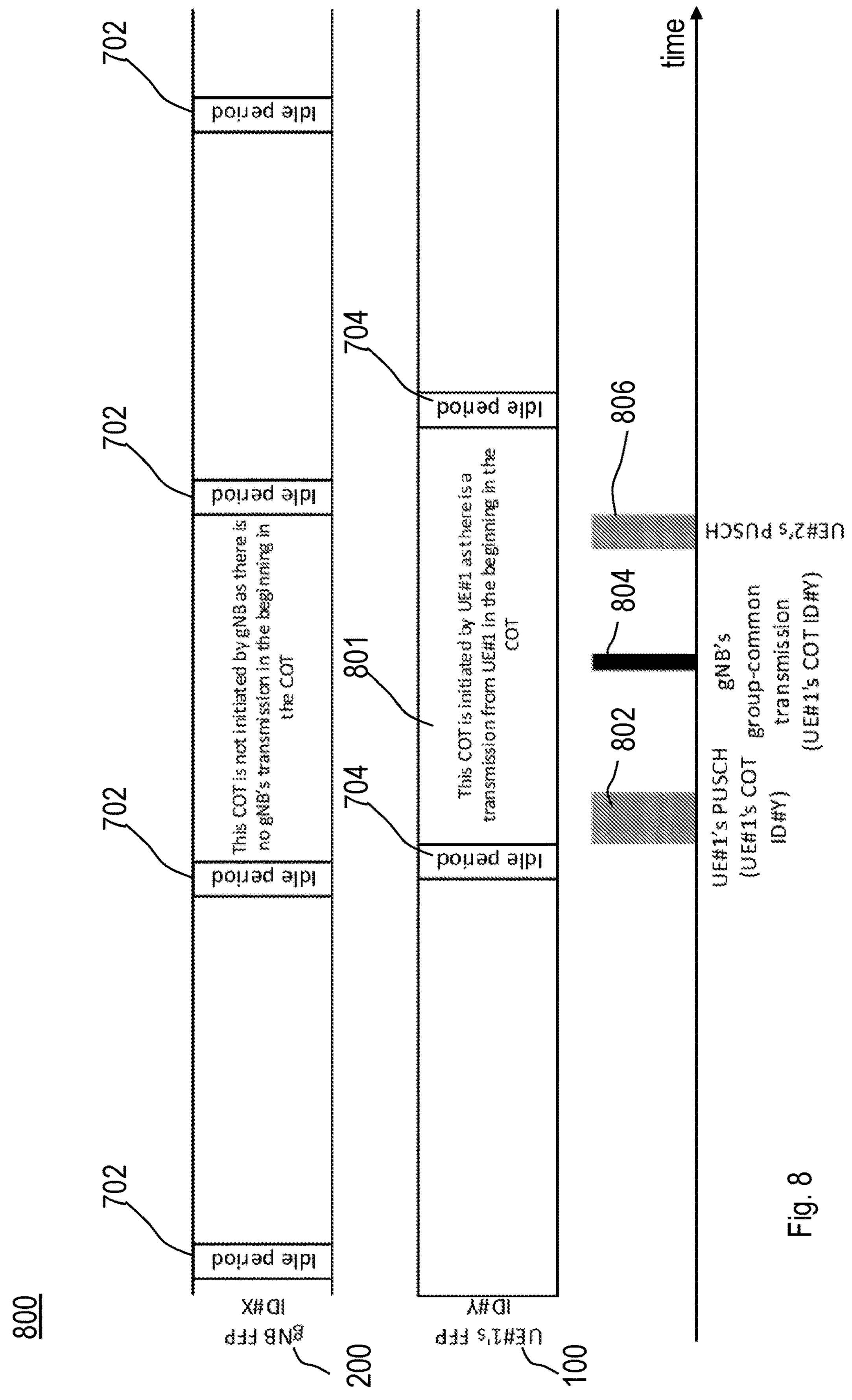
FIG. 8 schematically illustrates an example of a transmission by an embodiment of the device of FIG. 2 in a channel occupancy time initiated by an embodiment of the device of FIG. 1 for performing the methods of FIGS. 3 and 4, respectively.

First, we describe a scenario, e.g., as schematically illustrated in FIG. 8, wherein a first radio device 100 (referred to by UE #1 without limitation) has initiated its own COT (i.e., the first COT 801, e.g. by a transmission 802). A second radio device (UE #2) is scheduled in gNB COT (i.e., the second COT). The network node 200 (referred to by gNB without limitation) has responded to UE #1 with some group-common transmission.

Now, there can be a confusion that UE #2 may transmit in gNB COT even if gNB 200 has not initiated its gNB COT. This is against the rule as the COT (e.g., the channel) is not grabbed (e.g., occupied) by gNB 200, but UE #2 may transmit there. Question is why UE #2 ended up making a wrong decision. This may be because, this group common transmission can be read by UE #2, and if both gNB COT and UE COT are overlapping, then UE #2 thinks gNB is transmitting in gNB COT but actually the gNB is transmitting in UE's COT. At least some of the embodiments, e.g., the enumerated embodiments 5 to 10, may be implemented to eliminate this wrongful behavior.

FIG. 8 schematically illustrates a time sequence 800 of (e.g. potential) temporal radio resources 704 and 702 (e.g., idle periods) associated with the first and second COT, respectively.

Let us consider an assumption, UE-to-UE sharing not allowed, i.e., UE #2 PUSCH cannot be shared with UE #1's FFP. If this assumption is followed, then UE #2 PUSCH can only be transmitted if gNB COT is initiated because this PUSCH cannot be transmitted as a part UE #1's COT. However, if the gNB COT is not initiated by gNB 200 and gNB 200 transmits group-common transmission as a part of UE #1 COT 801, then this group-common transmission can be detected by UE #2. UE #2 may misinterpret the group-common transmission as a part of a gNB COT. However, actually it is a part of UE #1 COT 801. With this wrong understanding, UE #2 may transmit and thus break the rule.

5. In one embodiment, the group-common transmission may indicate that this group-common transmission belongs to a specific COT, e.g., it can mention COT ID #Y in group-common transmission. Now if UE #2 reads this transmission, it will know, that this group-common transmission is not a part of gNB COT (which has COT ID #X), rather it's part of some other COT, i.e., COT ID #Y.
6. In one embodiment, the gNB may include a flag, e.g., 1-bit flag, in the group-common transmission indicating:
   a. either the transmission is part of gNB COT, e.g., by setting, flag=0, or
   b. the transmission is a part of some UE COT, e.g., by setting, flag=1. Now, when UE #2 reads this group-common transmission and finds that the flag value is 1, then it understands the transmission is transmitted as a part of some UE initiated COT instead of a gNB initiated COT.
7. In Embodiment 6, the flag has two options. Extending this, the flag may have more than two options. Each option indicates a COT ID. Some COT ID(s) is indicative of a gNB COT ID(s) and other options represent the various COT IDs of UE initiated COTs for different UEs. First the scenario of Embodiment 5 will be expanded. In the expanded scenario, there is another UE #3, which is configured with three UE initiated COT configurations, gNB is also configured with two gNB COT configurations (note, at a time, any node (UE/gNB) can initiate only one COT), UE #1 is allowed to initiate only one COT, and UE #2 is provided with no COT configuration which it can initiate. Let us represent these configurations with COT IDs, gNB is configured for COT initiation for configuration COT ID #0, COT ID #1; UE #1 is configured for COT initiation for configuration COT ID #2; UE #3 is configured for COT initiation for configuration COT ID #3, COT ID #4, COT ID #5. Further, all UEs are configured to transmit in gNB's COT ID #0, but in COT ID #1, only UE #2 has the access, and also, we implement COT sharing between UEs, where UE #3 is configured to share COT with UE #2 over COT ID #4 (but UE #3 need not know about or vice-versa, as gNB can schedule transmission over COT ID #4). The example may be summarized according to the below Table 2.

TABLE 2

COT access restriction for non-initiating UEs

| Node | Node's initiating COT configurations | Initiating node share its COT with other nodes (non-initiator) |
|---|---|---|
| gNB | COT ID#0, | UE#1, UE#2, UE#3 |
| | COT ID#1 | UE#2 |
| UE#1 | COT ID#2 | gNB |
| UE#2 | none | |
| UE#3 | COT ID#3 | gNB |
| | COT ID#4 | gNB, UE#2 |
| | COT ID#5 | gNB |

Let us assume, there is group-common transmission in some COT. Thus, there may be confusion whether UE #2 is allowed to transmit or not if it detects group-common transmission over the resource which has overlapping COT configurations. Before proceeding, some flag options may be defined as, i.e., a. Flag=000 indicates COT #0
b. Flag=001 indicates COT #1
c. Flag=010 indicates COT #2
d. Flag=011 indicates COT #3
e. Flag=100 indicates COT #4
f. Flag=101 indicates COT #5
g. Flag=110 not configured
h. Flag=111 not configured Now, a 3-bit flag has been defined, and when the gNB transmits its group-common transmission it camayn indicate the flag option indicating the COT ID where this group-common transmission is transmitted in. If the group-common transmission indicates flag option 000, 001, 100; then UE #2 can transmit after reading the group-common transmission within the same COT period where it has detected the transmission after performing appropriate LBT category (e.g., depending on the time-gap between group-common and UE #2's scheduled transmission in the same COT period). Note, if UE #2 has detected group-common transmission in a COT period 'n' for some COT ID, then UE #2 is allowed to transmit in period n given the group-common transmission has valid flag (COT ID) indication, but it does not mean UE #2 has the access in period n+1 (the UE #2 has to go through same procedure again as in period 'n').

Hence, to allow this type of access mechanism, the gNB may provide UEs with some a-priory information (e.g., as exemplified in Table 2), so that the UE 100 knows based on the COT ID indicated in the flag, whether the UE 100 has the access right or not, e.g., a. gNB may configure UE's RRC with the COT IDs, for which the UE has the access, e.g., as
   i. an initiator, or
   ii. non-initiator Some examples are (in reference to Table 2)

i. In UE #'s RRC, it is stored with COT IDs, i.e., COT IDs, ID #0, ID #1, ID #4 as a part of non-initiator IDs
ii. In UE #3's RRC, it is stored with information, the COT IDs, ID #3, ID #4, ID5 which UE #3 is allowed to initiate, and as a non-initiator in COT ID #0 a) UE #3 does not need to know that the UE #2 has the access to its COT because it is gNB's headache how it schedule, and gNB's headache to inform UE #2 that it can transmit in COTID #4 if it's initiated by UE #3 via group-common transmission or even unicast transmission.

b. UEs can be configured with which COT IDs it does not have access to (as an initiator or as a non-initiator), but if option 'a' is provided, then this option 'b' can be optional because the UE can deduce that for all remaining IDs which are not option 'a', it cannot transmit as an initiator/non-initiator c. The group-common transmission may be based on, e.g., DCI format 2_0, 2_4.

8. In Embodiment 7, we presented a complex scenario where the gNB configures UE #3 to share its COT with UE #2 over COT ID #4. In this embodiment, more rules on UE-to-UE COT sharing are provided a. In one option, as an example UE #2's scheduled allocation overlaps with UE COT ID #4 and gNB COT ID #0. Further assuming, UE COT ID #4 is active and UE #2's scheduled resource overlaps with COT ID #4's idle period; also, gNB COT ID #0 is active and the UE #2's same scheduled resource overlaps with COT ID #O's valid COT period. Given COT ID #4 is active (initiated by UE #3), the following possibilities may happen, if the gNB transmits group-common transmission i. As a part of the gNB COT over COT ID #0, UE #2 can transit after reading the transmission, the transmission may be group-common or unicast based (i.e., only meant for UE #2)

ii. As a part of UE COT ID #4's transmission (gNB's group-common transmission indicates flag option 100), then UE #2 should not transmit even though UE #2 has the access to COT ID #4, because UE #2 scheduled resource overlaps with COT ID #4' idle period. To make sure UE #2 does not transmit in COT ID #4's idle period, following options may be applied a) UE #2 is provided with COT ID #4's details in RRC, e.g., COT's periodicity, idle period locations, then UE #2 will know by itself its scheduled resource overlaps with idle period of COT ID #4, so it should not transmit b) In group-common transmission, when the gNB indicates a flag corresponding to COT ID #4 activation, it may additionally indicate, e.g., the remaining COT (COT ID #4) equivalent to zero. This may mean that after group-common transmission in COT ID #4, the remaining COT has invalid period or idle period, so that UEs cannot transmit even though they have access c) In group-common transmission, when the gNB indicates a flag corresponding to COT ID #4, it may additionally indicate, e.g., the remaining valid part of COT/FFP and/or non-valid part of the COT/FFP (COT ID #4). This may mean that after group-common transmission in COT ID #4, certain UEs cannot transmit over the resource which is a part of non-valid region, e.g., idle period if they have scheduled allocation overlapping with it.

d) The gNB does not send group-common transmission (instead it may send in the form of some unicast transmission responding to another UE but not UE #2 in COT ID #4), thus UE #2 will be unable to detect the transmission and thus UE #2 knows that it cannot transmit as a part of COT ID #4 as it has not detected the transmission e) The group-common transmission may indicate which UEs that are allowed to transmit or not. For example, it may indicate UE #2 is not allowed to transmit (because it has overlapping allocation with idle period) but some other UE, say UE #4 is allowed to transmit in COT ID #4 as it's resource is not overlapping with idle period of COT ID #4. Hence, the gNB may mention UE ID #4 in the group-common transmission, thus UE ID #4 may transmit but not UE ID #2. For this option, the gNB may skip configuring UEs in RRC, e.g., the UE may have access to which COT IDs (as a non-initiator) it may transmit in, because if the gNB does group-common transmission it may indicate which UEs are allowed to transmit after reading this group-common transmission. So, if group-common transmission says UE #2 can transmit, it may transmit otherwise not; UE #2 need not to know which COT is active, COT ID #4 or COT ID #0 because if gNB thinks that if UE #2 transmits and might break the rule, e.g., by transmitting in idle period, then in group-common transmission, gNB never indicates UE #2, and thus UE #2 won't transmit. In summary, group-common transmission tells UE whether it can transmit or not without the need to (a) configure UE with all the possible COT IDs in RRC for the access (as a non-initiator) and (b) the flag options indications.

9. Extending Embodiment 8-a-ii-e), in this embodiment, methodologies described in embodiment 7 are not necessarily included, e.g., the flag is not described here, nor the configuration with RRC with various restriction on COT IDs access for non-initiator UEs. It is assumed that all the UEs belonging to a gNB have the default right in any node's (gNB and its UEs) COT as a non-initiator transmitter, i.e., e.g., in Table 2, there will be no restriction defined as per third column, i.e., all UEs are allowed to act as non-initiator in all gNB's COT IDs; whereas in UE initiated COT IDs, then all the remaining UEs can act as a non-initiator transmitter. The reason for clipping the restriction away, a non-initiator cannot transmit in some active UE-initiated COT because the transmissions are gNB-controlled, therefore, a non-initiating UE will not transmit, if there is no scheduled resource in the COT, or if the gNB does not indicate to the non-initiating UE by some means that it is allowed to transmit on its resource in some other UE's initiated COT. This is because the non-initiator UE cannot read initiating UE's transmission (therefore, non-initiating UE cannot know if COT is grabbed or not), and thus the non-initiating UE must rely on gNB's transmission as a form of indication which signifies that the initiating UE has grabbed the COT and the non-initiating UE may transmit on the resource (if it's valid, e.g., does not overlap with idle period).

Hence, it makes sense, when the gNB transmits in a UE-initiated COT, that it can tell the non-initiating UE in the COT whether it may transmit or not and skipping the non-initiating COT IDs configurations and flag options. The non-initiating UE need not to worry, whether the COT is grabbed or not, or if it's resource is overlapping with idle period or not; because in case the UE COT is not grabbed by the initiating UE or if UE COT is grabbed but non-initiating UE's resource is overlapping with COT's idle period, then the gNB makes sure that non-initiating UE will not transmit, e.g., by not responding or not indicating to the UE. See below examples.

- A node may have more than one COT configuration (for initiation), but at a time, the node may initiate only one COT.
- The non-initiator term may mean that for a given COT, the UE has no right to initiate the COT, but if this COT is initiated by some other UE which has the right to do it, then this non-initiated UE may transmit in this initiated COT as per gNB's subjected conditions and LBT/NR-U rules.

| Non-initiating UE's scheduled resource | The scheduled resource overlapping with some UE's active initiated COT period | Non-initiating UE's transmission behavior in some UE-initiated COT subject to gNB's transmission | Comment |
|---|---|---|---|
| UE#2's scheduled resource in active COT ID#4 | Resource is in valid part on active COT ID#4 | gNB sends unicast transmission (the unicast transmission is only read by UE#2)<br>gNB sends group-common transmission (which UE#2 can read) | This implies UE#2 may transmit even without knowing COT ID#4 identity or its valid portion |
| | Resource is in non-valid part of active FFP ID#4, i.e., on idle period | gNB does not send unicast transmission to UE#2<br>gNB does not transmit group-common transmission | This implies UE#2 will not detect gNB's transmission, therefore it cannot transmit (without knowing COT ID#4 identity or its idle period region) |
| UE#2's and UE#4's scheduled resource in active COT ID#4 | Both UE's resource is in valid part on active COT ID#4 | gNB sends two unicast transmissions to the UEs (the unicast transmission to UE#2 and another to UE#4)<br>gNB sends group-common transmission (which is read by both UEs) | This implies both UEs can transmit even without knowing COT ID#4 identity or its valid portion |
| | Both UE's resource is in non-valid part on active FFP ID#4, e.g., on idle periods | gNB does not send unicast transmission to any UE<br>gNB does not send group-common transmission | This implies both UEs have not detected gNB's transmission, therefore they cannot transmit (without knowing COT ID#4 identity or its idle period region) |
| | UE#2's resource overlaps with idle period and UE#4's resource overlaps with valid part on active COT ID#4 | gNB sends unicast transmission to UE#4 | This implies UE#4 can transmit but UE#2 cannot |
| | UE#4's resource overlaps with idle period and UE#2's resource overlaps with valid part on active COT ID#4 | gNB sends unicast transmission to UE#2 | This implies UE#2 can transmit but UE#4 cannot |

In any embodiment, e.g. in each of enumerated Embodiments 5 to 9, at least one of the following rules may be applied (e.g., at least one rule may not be broken):

- If a given COT is not initiated, no node may transmit in that COT even though it has access/or is allowed
- If a given COT is initiated, the UE is allowed to transmit provided it has scheduled allocation provided by the gNB, and the UE has LBT success (various categories depending on time-gaps between the transmissions)
- If a given COT is initiated, the nodes which transmit as a part of the COT cannot transmit over COT's idle period Any of the embodiments may assume that in UE-to-UE COT sharing, the non-initiating UE cannot read the initiating UE's transmission (based on current implementation). In order to make sure that a non-initiating UE transmits in this UE COT, gNB should transmit in this COT (in the form of group-common or unicast based with valid options as discussed above) so that non-initiating UEs can read the gNB's transmission and understand that this COT is initiated and it's okay for non-initiating UE to transmit as part of this COT.

10. In a UE-to-UE COT sharing, it was described in Embodiments 8 and 9 that the non-initiating UE in the shared COT transmits by first sensing/decoding gNB's transmission, as the non-initiating UE cannot read UE-initiating transmission in the COT (above assumption). However, in advanced mechanisms, the non-initiating UE can read the UE initiating COT transmission, thus the non-initiating UE does not need any indication from gNB whether it can transmit or not. In order to read initiating UE's transmission, following options may be applied
    a. Non-initiating UE is able to read initiating transmission which may be based on side link control channel or side link shared channel (via D2D)
    b. Non-initiating UE is able to read initiating transmission's e.g., DMRS, or UCI (multiplexed with initiating transmission, where UCI may be some sequence), or UE ID, etc.

Therefore, the non-initiating UE must be configured so that it knows the DMRS/UCI sequence/UE ID of initiating UE, so that if non-initiating UE detects the initiating UE's transmission, it can safely assume that the COT is grabbed and the non-initiating UE can transmit subject to LBT category without the need of indication from the gNB.

Section C: COT Selection Between UE COT and gNB COT

The technique may be applied in a scenario, wherein on a given resource, the UE 100 may transmit either as a responding device in a gNB-initiated COT (gNB COT, i.e., the second COT) or in a UE-initiated COT (UE COT, i.e. a first COT). Furthermore, if the UE 100 transmits, then how will the gNB 200 know which COT UE has been selected or is to be selected?

Figure 9A:
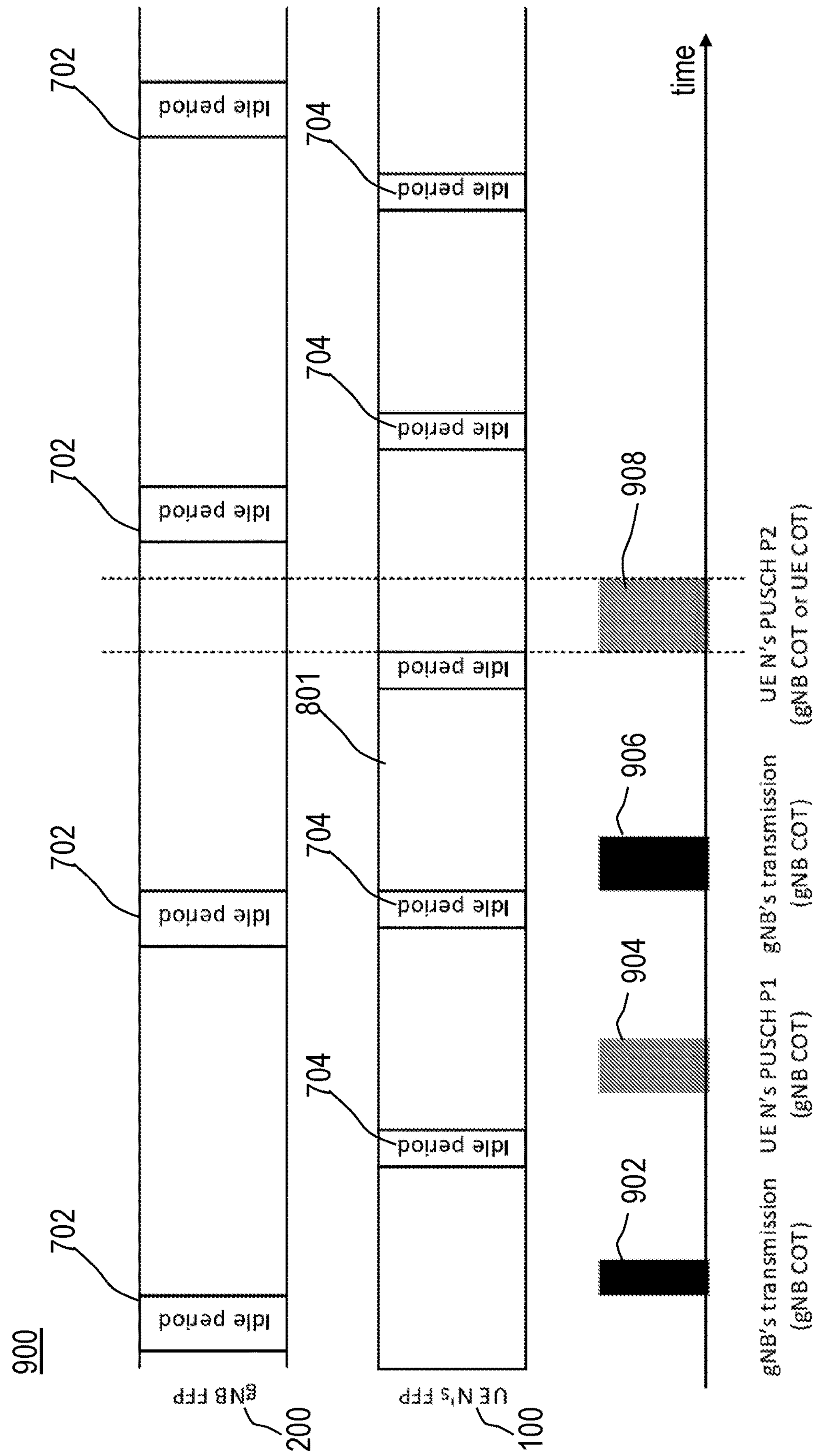
FIG. 9*a* schematically illustrates an example of a transmission by an embodiment of the device of FIG. 1 for initiating a channel occupancy time or within a channel occupancy time initiated by an embodiment of the device of FIG. 2 for performing the methods of FIGS. 3 and 4, respectively.

FIG. 9*a* schematically illustrates a temporal sequence 900 comprising FFPs of the gNB 200 and FFPs of the UE 100.

The given DL transmission and scheduled PUSCH have overlapping COT configurations (e.g., FFP of the gNB 200 and FFP of the UE 100 may overlap). For a case with allocated PUSCH P2 908, if gNB COT is initiated, then UE 100 has the possibility to transmit PUSCH P2 908 on gNB COT. But, at the same time PUSCH can be transmitted via UE-initiated COT transmission as the PUSCH P2 is scheduled in the beginning of the UE FFP (i.e., after UE's idle period). Conventionally, this may cause confusion to gNB that whether the transmitted PUSCH P2 is part of gNB COT or UE COT. On the other hand, for PUSCH P1 904, there is no such confusion as PUSCH P1 904 cannot be transmitted via UE-initiated COT because its allocation is not in the beginning of UE FFP period.

11. In order to not to have confusion over COT selection, the gNB 200 may indicate the priority according to which the COT should be selected in scheduling or CG activation DCI or via RRC configuration (e.g., RRC PUSCH config parameter). The information (COT selection) may be indicated in at least one of the following ways:
    A. In one option, the gNB 200 configures 2-bit priority information and indicate one of the following options in DCI/RRC (out of following 4 options)
        i. If gNB COT is initiated, then UE COT is prioritized w.r.t. gNB COT
        ii. If gNB COT is initiated, then UE COT is not prioritized w.r.t. gNB COT
        iii. If gNB COT is not initiated, then UE COT is allowed
        iv. If gNB COT is not initiated, then UE COT is not allowed (this may mean if gNB COT is not initiated, then the UE should not transmit)
    b. In one option, gNB 200 configures 1-bit priority information and indicates one of the following options in DCI/RRC (out of following 2 options)
        i. If gNB COT is initiated, then UE COT is prioritized w.r.t. gNB COT
        ii. If gNB COT is initiated, then UE COT is not prioritized w.r.t. gNB COT If gNB COT is not initiated, gNB 200 may configure in RRC that the UE 100 is allowed to transmit in UE COT
    c. In one option, the gNB 200 configures 1-bit priority information and indicates one of the following options in DCI/RRC (out of following 2 options)
        i. If gNB COT is initiated, then UE COT is prioritized w.r.t. gNB COT
        ii. If gNB COT is initiated, then UE COT is not prioritized w.r.t. gNB COT If gNB COT is not initiated, the gNB 200 may configure in RRC that the UE 100 is not allowed to transmit in UE COT
    d. In one option, the gNB 200 configures 1-bit information and indicate one of the following options in DCI/RRC (out of following 2 options)
        i. UE COT is allowed (irrespective of gNB COT)
        ii. UE COT is not allowed (irrespective of gNB COT)

Hence, given the information related to COT selection between UE COT and gNB COT in DCI/RRC, UE selects the COT accordingly. This priority information ma be updated by sending the DCI again or reconfiguring the RRC. In DCI, the priority options may be configured over Channel Access Type, the CP extension fields or by introducing new fields in DCI format 0_0, 0_1, 0_2.

12. In another embodiment, if both COTs are applicable (UE COT and gNB COT), then the UE 100 may mention COT selection information in the UCI, that the UL transmission belongs to which COT, where the UCI may be multiplexed with the UL transmission. The UL transmission may be dynamic PUSCH or CG PUSCH. For CG PUSCH, CG-UCI included with COT selection information may be used.
13. In another embodiment, if the UE 100 is allocated with multiple repetitions, and on some repetitions, both gNB COT and UE COT are applicable, then following options may be applied
    a. All the repetitions should follow the COT of first repetition
        i. For example, if first repetition is transmitted in gNB COT, then the following repetitions must be done in gNB COT. If for some following repetition, the gNB COT fails (e.g., gNB COT is not initiated), then UE 100 may not transmit those following/remaining repetitions in UE COT (even if it is possible) because first repetition is transmitted in gNB COT
        ii. For example, if first repetition is transmitted in UE COT, then the following repetitions must be done in UE COT. If for some of the following repetition, the UE COT fails (e.g., fails to initiate), then UE may not transmit with those following repetitions in gNB COT (even if it is possible) because first repetition is transmitted in UE COT
    b. UE 100 may transmit repetitions over both gNB COT and UE COT, e.g., if the first repetition is over gNB COT and successive repetitions may be over UE COT.

i. When UE 100 transmits repetition over the COT where both COTs are applicable, UE 100 may decide autonomously or select the COT for repetition based on priority rules defined in Embodiment 11

Section D: COT Cancellation of UE Initiated COT

UE 100 may have an active UE-initiated COT. However, there could be a scenario in which the gNB 200 wants to cancel a UE-initiated COT. Thus, the following embodiments enable this behavior.

14. In this embodiment, it is proposed to utilize scheduling or CG activation DCI to cancel the UE-initiated COT. For example, Embodiment 11's options may be utilized where DCI is sent with new priority or COT selection information. For example, this is UE initiated COT cancellation using unicast operation.
15. In another embodiment, group-common DCI is used, e.g., format 2_0, 2_4, to cancel the UE initiated COT. This is similar to Embodiment 4-a to 4-c options, where in Embodiment 4, e.g., gNB 200 cancels or applies restrictions in idle periods. Now, in this embodiment, the restriction become, "cancel UE initiated COT", and is applied in a similar fashion as in options a to c in Embodiment 4. For example, the gNB 200 may send group-common DCI to cancel UE initiated COT over "reference resources", or "time-span", or "COT number". Further, there may be two flavors for cancellation with COT number where the gNB 200 may tell the UE 100 or a group of UEs that they should cancel their UE initiated COT on given
    a. gNB COT numbers; all UEs should know the gNB COT configuration; and the UEs which are engaging in UE-initiated COT, they will cancel their UE-initiated COT on indicated gNB COT numbers, or
    b. COT numbers on specific COT ID; in Embodiment 7, the concept of COT ID was described, which can be gNB COT ID or UE COT ID. Hence, utilizing the same concept, here in this embodiment, all the UEs, which are engaging in UE-initiated COT will cancel their UE-initiated COT on the occasions of mentioned COT ID that are indicated by group-common DCI; it is important that all the UEs have pre-possessed information of COT IDs, which the gNB 200 may provide to the UEs during RRC configurations.

In group-common DCI transmission, all UEs will receive or may read the transmission, and if some UEs from the group don't have UE-initiated COT rights or configurations, they will ignore the command.

Section E: Different Options/Ways to Indicate Whether UL Transmission is in UE-COT (UE-Initiated COT) or gNB-COT (gNB-Initiated COT).

Some embodiments in Section E are further elaborations of the embodiments disclosed in Section B.

Further, some of the embodiments in Section B use DCI formats for scheduling PUSCH such as DCI Format 0_0, DCI Format 0_1 or DCI Format 0_2 as ways or options to indicate whether UL transmission is in UE-COT (UE-initiated COT) or gNB-COT (gNB-initiated COT).

For illustrative purposes content of DCI Format 0_0 from TS 38.212 is shown below.

7.3.1.1.1 Format 0_0

DCI format 0_0 is used for the scheduling of PUSCH in one cell.

The following information is transmitted by means of the DCI format 0_0 with CRC scrambled by C-RNTI or CS-RNTI or MCS-C-RNTI:

Identifier for DCI formats-1 bit

The value of this bit field is always set to 0, indicating an UL DCI format

Frequency domain resource assignment—number of bits determined by the following:

$$\lceil \log_2 (N_{RB}^{UL,BWP}(N_{RB}^{UL,BWP}+1)/2) \rceil$$

bits if neither of the higher layer parameters useInterlacePUCCH-PUSCH in BWP-UplinkCommon and useInterlacePUCCH-PUSCH in BWP-UplinkDedicated is configured, where $$N_{RB}^{UL,BWP}$$

is defined in clause 7.3.1.0

For PUSCH hopping with resource allocation type 1:

$N_{UL\_hop}$ MSB bits are used to indicate the frequency offset according to Clause 6.3 of [6, TS 38.214], where $N_{UL\_hop}=1$ if the higher layer parameter frequencyHoppingOffsetLists contains two offset values and $N_{UL\_hop}=2$ if the higher layer parameter frequencyHoppingOffsetLists contains four offset values $$\lceil \log_2 (N_{RB}^{UL,BWP}(N_{RB}^{UL,BWP}+1)/2) \rceil - N_{UL\_hop}$$

bits provide the frequency domain resource allocation according to Clause 6.1.2.2.2 of [6, TS 38.214]

For non-PUSCH hopping with resource allocation type 1:

$$\lceil \log_2 (N_{RB}^{UL,BWP}(N_{RB}^{UL,BWP}+1)/2) \rceil$$

bits provide the frequency domain resource allocation according to Clause 6.1.2.2.2 of [6, TS 38.214]

If any of the higher layer parameters useInterlacePUCCH-PUSCH in BWP-UplinkCommon and useInterlace-PUCCH-PUSCH in BWP-UplinkDedicated is configured 5 bits provide the frequency domain resource allocation according to Clause 6.1.2.2.3 of [6, TS 38.214] if the subcarrier spacing for the active UL bandwidth part is 30 KHz.

6 bits provide the frequency domain resource allocation according to Clause 6.1.2.2.3 of [6, TS 38.214] if the subcarrier spacing for the active UL bandwidth part is 15 kHz.

If the DCI format 0_0 is monitored in a UE-specific search space, the value of Y is determined by $$\left\lceil \log_2\left(\frac{N_{RB-set,UL}^{BWP}(N_{RB-set,UL}^{BWP}+1)}{2}\right)\right\rceil \text{ where } N_{RB-set,UL}^{BWP}$$

is the number of RB sets contained in the active UL BWP as defined in clause 7 of [6, TS38.214]. If the DCI 0_0 is monitored in a common search space Y=0.

- Time domain resource assignment—4 bits as defined in Clause 6.1.2.1 of [6, TS 38.214]
- Frequency hopping flag—1 bit according to Table 7.3.1.1.1-3, as defined in Clause 6.3 of [6, TS 38.214]
- Modulation and coding scheme—5 bits as defined in Clause 6.1.4.1 of [6, TS 38.214]
- New data indicator—1 bit
- Redundancy version—2 bits as defined in Table 7.3.1.1.1-2
- HARQ process number—4 bits
- TPC command for scheduled PUSCH—2 bits as defined in Clause 7.1.1 of [5, TS 38.213]
- ChannelAccess-CPext—2 bits indicating combinations of channel access type and CP extension as defined in Table 7.3.1.1.1-4, or Table 7.3.1.1.1.4A, if ChannelAccessMode-r16="semistatic" is provided for operation in a cell with shared spectrum channel access; 0 bit otherwise.
- Padding bits, if required.
- UL/SUL indicator—1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
  - If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
  - If the UL/SUL indicator is not present in DCI format 0_0 and pucch-Config is configured, the corresponding PUSCH scheduled by the DCI format 0_0 is for the UL or SUL for which high layer parameter pucch-Config is configured.
  - If the UL/SUL indicator is not present in DCI format 0_0 and pucch-Config is not configured, the corresponding PUSCH scheduled by the DCI format 0_0 is for the uplink on which the latest PRACH is transmitted.

The following information is transmitted by means of the DCI format 0_0 with CRC scrambled by TC-RNTI:

- Identifier for DCI formats—1 bit
  - The value of this bit field is always set to 0, indicating an UL DCI format
- Frequency domain resource assignment—number of bits determined by the following:

$$\lceil \log_2 (N_{RB}^{UL,BWP}(N_{RB}^{UL,BWP}+1)/2) \rceil$$

bits if the higher layer parameter useInterlacePUCCH-PUSCH in BWP-UplinkCommon is not configured, where $$N_{RB}^{UL,BWP}$$

is the size of the initial UL bandwidth part.
  For PUSCH hopping with resource allocation type 1:
  $N_{UL\_hop}$ MSB bits are used to indicate the frequency offset according to Table 8.3-1 in Clause 8.3 of [5, TS 38.213], where $$N_{UL\_hop} = 1 \text{ if } N_{RB}^{UL,BWP} < 50 \text{ and } N_{UL\_hop} = 2$$

otherwise $$\lceil \log_2 (N_{RB}^{UL,BWP}(N_{RB}^{UL,BWP}+1)/2) \rceil - N_{UL\_hop}$$

bits provide the frequency domain resource allocation according to Clause 6.1.2.2.2 of [6, TS 38.214]
  For non-PUSCH hopping with resource allocation type 1:

$$\lceil \log_2 (N_{RB}^{UL,BWP}(N_{RB}^{UL,BWP}+1)/2) \rceil$$

bits provide the frequency domain resource allocation according to Clause 6.1.2.2.2 of [6, TS 38.214]
  If the higher layer parameter useInterlacePUCCH-PUSCH in BWP-UplinkCommon is configured
  - 5 bits provide the frequency domain resource allocation according to Clause 6.1.2.2.3 of [6, TS 38.214] if the subcarrier spacing for the active UL bandwidth part is 30 kHz
  - 6 bits provide the frequency domain resource allocation according to Clause 6.1.2.2.3 of [6, TS 38.214] if the subcarrier spacing for the active UL bandwidth part is 15 kHz
- Time domain resource assignment—4 bits as defined in Clause 6.1.2.1 of [6, TS 38.214]
- Frequency hopping flag—1 bit according to Table 7.3.1.1.1-3, as defined in Clause 6.3 of [6, TS 38.214]
- Modulation and coding scheme—5 bits as defined in Clause 6.1.4.1 of [6, TS 38.214]
- New data indicator—1 bit, reserved
- Redundancy version—2 bits as defined in Table 7.3.1.1.1-2
- HARQ process number—4 bits, reserved
- TPC command for scheduled PUSCH—2 bits as defined in Clause 7.1.1 of [5, TS 38.213]
- ChannelAccess-CPext—2 bits indicating combinations of channel access type and CP extension as defined in Table 7.3.1.1.1-4, or Table 7.3.1.1.1.4A, if ChannelAccessMode-r16="semistatic" is provided for operation in a cell with shared spectrum channel access; 0 bit otherwise
- Padding bits, if required.
- UL/SUL indicator—1 bit if the cell has two ULs and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
  - If 1 bit, reserved, and the corresponding PUSCH is always on the same UL carrier as the previous transmission of the same TB

TABLE 7.3.1.1.1-1

| UL/SUL indicator | |
|---|---|
| Value of UL/SUL indicator | Uplink |
| 0 | The non-supplementary uplink |
| 1 | The supplementary uplink |

TABLE 7.3.1.1.1-2

| Redundancy version | |
|---|---|
| Value of the Redundancy version field | Value of $rv_{id}$ to be applied |
| 00 | 0 |
| 01 | 1 |
| 10 | 2 |
| 11 | 3 |

TABLE 7.3.1.1.1-3

| Frequency hopping indication | |
|---|---|
| Bit field mapped to index | PUSCH frequency hopping |
| 0 | Disabled |
| 1 | Enabled |

TABLE 7.3.1.1.1-4

| Channel access type & CP extension for DCI format 0_0 and DCI format 1_0 | | |
|---|---|---|
| Bit field mapped to index | Channel Access Type | The CP extension T_"ext" index defined in Clause 5.3.1 of [4, TS 38.211] |
| 0 | Type2C-ULChannelAccess defined in [clause 4.2.1.2.3 in 37.213] | 2 |
| 1 | Type2A-ULChannelAccess defined in [clause 4.2.1.2.1 in 37.213] | 3 |
| 2 | Type2A-ULChannelAccess defined in [clause 4.2.1.2.1 in 37.213] | 1 |
| 3 | Type1-ULChannelAccess defined in [clause 4.2.1.1 in 37.213] | 0 |

TABLE 7.3.1.1.1-4A

| Channel access type & CP extension if ChannelAccessMode-r16 = "semistatic" is provided | | |
|---|---|---|
| Bit field mapped to index | Channel Access Type | The CP extension T_"ext" index defined in Clause 5.3.1 of [4, TS 38.211] |
| 0 | No sensing as defined in Clause 4.3 in TS 37.213 | 0 |
| 1 | No sensing as defined in Clause 4.3 in TS 37.213 | 2 |
| 2 | 9 us sensing within a 25 us interval as defined in Clause 4.3 in TS 37.213 | 0 |
| 3 | — | — |

Below several embodiments are disclosed wherein the DCI is used to indicate whether the UL transmission is in UE-COT (UE-initiated COT) or gNB-COT (gNB-initiated COT).

Option 1: Using 2-bits channel access field, CP extension is supported.

Indicating the assumption on the COT initiator for an UL transmission, using 2-bits channel access field based in table 7.3.1.1.1-4A.

If the UE 100 is indicated with index 0, 1, 2, the UE 100 assumes the UL transmission is based on sharing a COT that the gNB 200 initiated (gNB-COT/FFP).

If the UE 100 is indicated with index 3, the UE 100 assumes the UL transmission is based on a COT that the UE 100 initiated (UE-COT/FFP).

TABLE 7.3.1.1.1-4A

| Channel access type & CP extension if ChannelAccessMode-r16 = "semistatic" is provided | | |
|---|---|---|
| Bit field mapped to index | Channel Access Type | The CP extension T_"ext" index defined in Clause 5.3.1 of [4, TS 38.211] |
| 0 | No sensing as defined in Clause 4.3 in TS 37.213 | 0 |
| 1 | No sensing as defined in Clause 4.3 in TS 37.213 | 2 |
| 2 | 9 us sensing within a 25 us interval as defined in Clause 4.3 in TS 37.213 | 0 |
| 3 | — | — |

UL transmission, not aligned with FFP boundary, but within UE FFP and before idle period:

If the UE 100 for this UL transmission, is indicated with index 3

If the UE 100 has already initiated the COT, the UE 100 assumes UL transmission is valid (do (e.g., 9 μs sensing) or not do sensing based on the gap with its previous UL transmission).

Otherwise, the UE 100 assumes UL transmission is invalid (cancels the transmission)

UL transmission, aligned with FFP boundary, but with UE FFP and before idle period See Option 4.

Option 2: Using 2-bits channel access field, CP extension is not supported.

Indicating the assumption on the COT initiator for an UL transmission, using 2-bits channel access field based on table 7.3.1.1.1-4B below (from 3gpp TS 38.212)

If the UE 100 is indicated with index 0.2, the UE 100 assumes the UL transmission is based on sharing a COT that the gNB 200 initiated with no sensing and 9 μs sensing, respectively.

If the UE 100 is indicated with index 1.3, the UE 100 assumes the UL transmission is based on a COT initiated by the UE 100 with no sensing and 9 μs sensing, respectively.

TABLE 7.3.1.1.1-4B

| Channel access type & COT initiator if ChannelAccessMode-r16 = "semistatic" is provided | | |
|---|---|---|
| Bit field mapped to index | Channel Access Type | COT initiator |
| 0 | No sensing as defined in Clause 4.3 in TS 37.213 | gNB |
| 1 | No sensing as defined in Clause 4.3 in TS 37.213 | UE |
| 2 | 9 us sensing within a 25 us interval as defined in Clause 4.3 in TS 37.213 | gNB |
| 3 | 9 us sensing within a 25 us interval as defined in Clause 4.3 in TS 37.213 | UE |

- UL transmission, not aligned with FFP boundary, but within UE FFP and before idle period:
  - If the UE 100 for this UL transmission, is indicated with index 1, 3
    - If the UE 100 has initiated the COT, the UE 100 assumes UL transmission is valid (do or not do sensing for index 1 or 3, respectively). Otherwise, the UE 100 assumes UL transmission is invalid (cancels the transmission).
- UL transmission, aligned with FFP boundary, but with UE FFP and before idle period
  - The UE 100 is not expected to be indicated with index 1.
  - See Option 4.

Option 3: Using 3-bits channel access field, CP extension is supported.

- Indicating the assumption on the COT initiator for an UL transmission, using 3-bits channel access field based on table 7.3.1.1.1-4C below (from 3gpp TS 38.212).
- UL transmission, not aligned with FFP boundary, but within UE FFP and before idle period:
  - If the UE 100 for this UL transmission, is indicated with index 4, 5 or 6
    - If the UE 100 has initiated the COT, the UE 100 assumes UL transmission is valid (do or not do sensing as indicated). Otherwise, UE assumes UL transmission is invalid (cancels the transmission).
- UL transmission, aligned with FFP boundary, but with UE FFP and before idle period
  - UE is not expected to be indicated with index 4 or 5.
  - See Option 4.

TABLE 7.3.1.1.1-4C

| Channel access type & CP extension if ChannelAccessMode-r16 = "semistatic" is provided | | | |
|---|---|---|---|
| Bit field mapped to index | Channel Access Type | The CP extension T_"ext" index defined in Clause 5.3.1 of [4, TS 38.211] | COT initiator |
| 0 | No sensing as defined in Clause 4.3 in TS 37.213 | 0 | gNB |
| 1 | No sensing as defined in Clause 4.3 in TS 37.213 | 2 | gNB |
| 2 | 9 us sensing within a 25 us interval as defined in Clause 4.3 in TS 37.213 | 0 | gNB |
| 3 | — | — | — |
| 4 | No sensing as defined in Clause 4.3 in TS 37.213 | 0 | UE |
| 5 | No sensing as defined in Clause 4.3 in TS 37.213 | 2 | UE |
| 6 | 9 us sensing within a 25 us interval as defined in Clause 4.3 in TS 37.213 | 0 | UE |
| 7 | — | — | — |

Option 4:

- 2-bits bitfield in DCI using Table 7.3.1.1.1-4A may be used for any UL transmission scheduled at UE FFP boundary, i.e., initiating transmission (Option 1).
- 2 or 3 bits bitfield in DCI using Table 7.3.1.1.1-4A, 7.3.1.1.1-4B, 7.3.1.1.1-4C may be used for any UL transmission scheduled after UE FFP boundary, i.e., non-initiating transmission (option 1, Option 2, Option 3, respectively).

Option 5: In Table 7.3.1.1.1-4B, a 2-bit field is used to indicate 4 number of indices. However, in this option, a 2-bit field is still used, but to indicate 3 number of indices and one index may be left empty (for future or other use), see Table 7.3.1.1.1-4B-i where the changed behavior is implemented.

TABLE 7.3.1.1.1-4B-i

| Channel access type & COT initiator if ChannelAccessMode-r16 = "semistatic" is provided | | |
|---|---|---|
| Bit field mapped to index | Channel Access Type | COT initiator |
| 0 | No sensing as defined in Clause 4.3 in TS 37.213 | gNB |
| 1 | No sensing as defined in Clause 4.3 in TS 37.213 or 9 us sensing within a 25 us interval as defined in Clause 4.3 in TS 37.213 | UE |
| 2 | 9 us sensing within a 25 us interval as defined in Clause 4.3 in TS 37.213 | gNB |
| 3 | — | — |

- In this option there is only one index for UE COT initiator indication in the DCI grant for UE's UL transmission in UE FFP for both UE-COT initiating transmission and UE's valid (non-initiating) transmission in UE's COT/FFP (depicted in Table 7.3.1.1.1-4B-i)
  - Unlike, in Table 7.3.1.1.1-4B, there are two indices designated for UE-COT initiator indications in the DCI grant in UE's UL transmission in UE-COT/FFP (index 1 is used to indicate non-initiating UL transmission, and index 3 is used to indicate both initiating & non-initiating transmission in UE's COT (FFP)).

The reason to have one index for UE-COT initiator is because (in Table 7.3.1.1.1-4B-i), the UE 100 knows the gaps or UL transmission location, and may apply the appropriate LBT before its UL transmission whether to do no sensing or 9 µs sensing depending, e.g., UL initiating transmission If UL transmission is allocated at beginning of COT, the UE 100 will use 9 µs sensing (e.g. according to a rule: 9 µs sensing within a 25 µs interval as defined in Clause 4.3 in TS 37.213)

Non-initiating transmission

If UL transmission is allocated withing the COT such as back to back with previous UL transmission, then there is no gap wrt previous UL transmission, hence the UE 100 will not do sensing for the allocated UL transmission (e.g. according to a rule: No sensing as defined in Clause 4.3 in TS 37.213)

If UL transmission is allocated where the gap wrt previous UL transmission os greater 16 µs (e.g., rule: 9 µs sensing within a us interval as defined in Clause 4.3 in TS 37.213), then the UE 100 will do 9 µs sensing before the UL transmission Thus, it is not needed to indicate which sensing, or LBT type (0 or 9 µs sensing) the UE 100 should implement. Instead, the UE 100 has knowledge to deduce that (based on UL's location in the COT and the gaps), and therefore, only one index is enough here just to indicate that the UL transmission is allocated in UE FFP. UL transmission may be PUSCH or PUCCH based transmission.

Similar to the above, in another option, a changed behavior may be implemented for Table 7.3.1.1.1-4C where the UE 100 may deduce LBT type just like for Table 7.3.1.1.1-4B-i. Hence, only two indices are may be needed (index 4 and 5) for UE-COT related transmission. A new behavior is depicted in Table 7.3.1.1.1-4C-i TABLE 7.3.1.1.1-4C-i

| Channel access type & CP extension if ChannelAccessMode-r16 = "semistatic" is provided | | | |
|---|---|---|---|
| Bit field mapped to index | Channel Access Type | The CP extension T_"ext" index defined in Clause 5.3.1 of [4, TS 38.211] | COT initiator |
| 0 | No sensing as defined in Clause 4.3 in TS 37.213 | 0 | gNB |
| 1 | No sensing as defined in Clause 4.3 in TS 37.213 | 2 | gNB |
| 2 | 9 us sensing within a 25 us interval as defined in Clause 4.3 in TS 37.213 | 0 | gNB |
| 3 | — | — | — |
| 4 | No sensing as defined in Clause 4.3 in TS 37.213 or 9 us sensing within a 25 us interval as defined in Clause 4.3 in TS 37.213 | 0 | UE |
| 5 | No sensing as defined in Clause 4.3 in TS 37.213 | 2 | UE |
| 6 | — | — | — |
| 7 | — | — | — |

Option 7: In one embodiment, the restrictions are applied in above options. Thus new options may emerge thereafter. For example, consider an example of Table 7.3.1.1.1-4C. The restriction applied for e.g., index 4 and 5 can never be applied for DCI grant allocating UL transmission at UE FFP boundary (i.e., for initiating transmission). It means, for an UL transmission at UE FFP boundary (after idle period), and if index in DCI either maps to index 4 or 5, it will result in a scheduling error. This is because, by regulation, the UE 100 must do 9 µs sensing when it begins transmitting in UE FFP (i.e., initiating transmission). However if index in DCI maps to no-sensing then this will result in a scheduling error, and therefore such scheduling events should never be allowed. Hence, the table may be updated to Table 7.3.1.1.1-4C-ii.

TABLE 7.3.1.1.1-4C-ii

| Channel access type & CP extension if ChannelAccessMode-r16 = "semistatic" is provided | | | |
|---|---|---|---|
| Bit field mapped to index | Channel Access Type | The CP extension T_"ext" index defined in Clause 5.3.1 of [4, TS 38.211] | COT initiator |
| 0 | No sensing as defined in Clause 4.3 in TS 37.213 | 0 | gNB |
| 1 | No sensing as defined in Clause 4.3 in TS 37.213 | 2 | gNB |
| 2 | 9 us sensing within a 25 us interval as defined in Clause 4.3 in TS 37.213 | 0 | gNB |

TABLE 7.3.1.1.1-4C-ii-continued

| Channel access type & CP extension if ChannelAccessMode-r16 = "semistatic" is provided | | | |
|---|---|---|---|
| Bit field mapped to index | Channel Access Type | The CP extension T_"ext" index defined in Clause 5.3.1 of [4, TS 38.211] | COT initiator |
| 3 | — | — | — |
| 4 | No sensing as defined in Clause 4.3 in TS 37.213 | 0 | UE *Not applicable for UE-COT initiating transmission |
| 5 | No sensing as defined in Clause 4.3 in TS 37.213 | 2 | UE *Not applicable for UE-COT initiating transmission |
| 6 | 9 us sensing within a 25 us interval as defined in Clause 4.3 in TS 37.213 | 0 | UE |
| 7 | — | — | — |

Option 8: In one embodiment, if we consider UL transmission in UE-COT, where the UL transmission is a non-initiating transmission in UE FFP and before this UL transmission is a DL transmission in the same UE FFP. Then the UE 100 may consider the following rules to determine gaps to deduce which LBT type should be applied (this methodology may be used with above options, e.g., in option 1, UE is indicated with index 3, then the UE 100 determines the gap and LBT type for it UL transmission)

Rule 1: the UE 100 always assumes gap for this UL transmission w.r.t. previous UL transmission to determine LBT type (based on rules defined in Clause 4.3 in TS 37.213) for this UL transmission. It will ignore all DL possible transmissions for this purpose between the UL transmission. For example, if we have below scenario then, to determine LBT type for UL #2 transmission based on rules defined in Clause 4.3 in TS 37.213, the UE 100 calculates gap as X+Y+Z. Based on rules defined in Clause 4.3 in TS 37.213, if the gap (X+Y+Z) is less than 16 μs, then no sensing is needed otherwise 9 μs sensing is performed within a us interval.

Figure 9B:
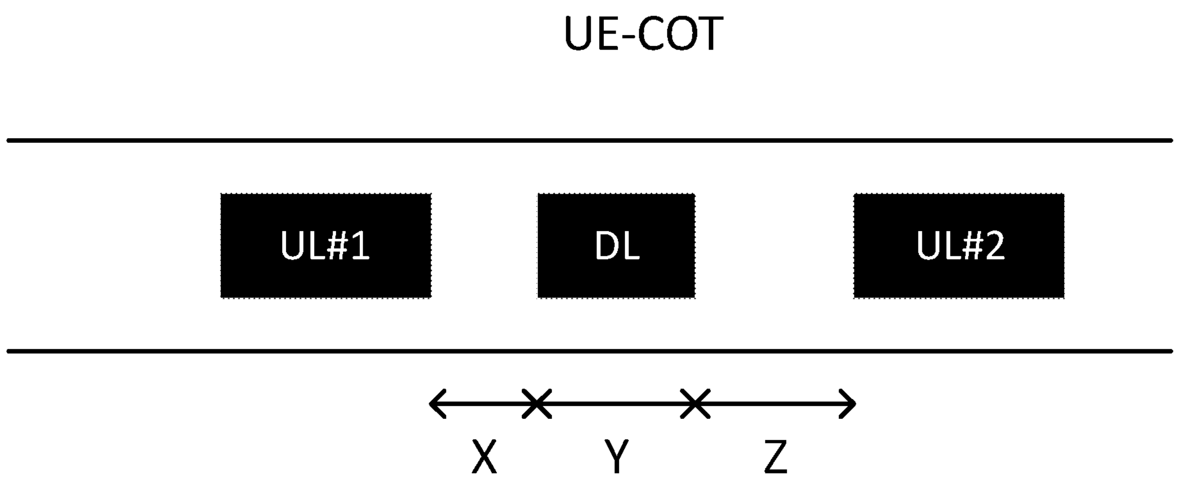
FIG. 9*b* schematically illustrates UL and DL transmissions in a UE-COT.

Rule 1: UE 100 always assumes gap for this UL transmission w.r.t. pervious transmission irrespective of whether it's UL or DL. FIG. 9*b* illustrates UL #1, DL and UL #2 transmission in a UE-COT. Hence, based on FIG. 9*b*, the gap is measured as Z. Based on rules defined in Clause 4.3 in TS 37.213, if the gap (Z) is less than 16 μs, then no sensing is needed otherwise 9 μs sensing within a 25 μs interval.

Option 9: DCI formats 1_0, 1_1, 1_2 are utilized to allocate PDSCH (DL) and HARQ-ACK (UL transmission). To identify whether UL transmission is in UE-COT or gNB-COT, the UE checks the index in DCI (based on above options/tables). However, to indicate to UE, whether PDSCH will be transmitted in UE-COT or gNB-COT, additional bitfields may be included, at least of 1 bit, in the DCI formats 1_0, 1_1, 1_2 which allow the network to configure the index for this bitfield either for UE-COT or gNB-COT for PDSCH transmission.

Option 9a: In another option, no bitfield in DCI is allocated for indication of PDSCH's transmission in the COT type, rather the UE deduces the COT of PDSCH based on following non-limiting rules (rule a-f), such as.

Rule a: If one COT/FFP is active, either UE-COT or gNB-COT, and the UE 100 receives PDSCH in this valid active COT (not in idle period), then the UE 100 will decode the PDSCH.

If both UE-COT/FFP and gNB-COT/FFP are active

If the PDSCH overlaps with valid COT of UE-COT and also overlaps with valid COT of gNB-COT.

Rule b: Then, the UE 100 will decode PDSCH

If the PDSCH overlaps with valid COT of UE-COT but overlaps with idle period COT of gNB-FFP.

Rule c: the UE 100 will decode PDSCH.

Rule d: the UE 100 will not decode PDSCH

If the PDSCH overlaps with idle period of UE-COT but overlaps with valid COT of gNB-COT.

Rule e: the UE 100 will decode PDSCH.

Rule f: the UE 100 will not decode PDSCH

Option 10: In one embodiment, all the above embodiments (options) where bitfields were defined may be applied DCI format 0_0, 0_1, 0_2, 1_0, 1_1, 1_2 in a non-limiting manner.

Note:

1. Above presented tables/mappings are just examples, for instance in various tables, the mapping of indices may be different/change, e.g., in another version of Table 7.3.1.1.1-4B, index 0 and 1 corresponds to UE COT initiator category and index 2 and 3 corresponds to gNB COT initiator category, see below Table 7.3.1.1.1-4B-ii TABLE 7.3.1.1.1-4B-ii

| Channel access type & COT initiator if ChannelAccessMode-r16 = "semistatic" is provided | | |
|---|---|---|
| Bit field mapped to index | Channel Access Type | COT initiator |
| 0 | No sensing as defined in Clause 4.3 in TS 37.213 | UE |

TABLE 7.3.1.1.1-4B-ii-continued

| Channel access type & COT initiator if ChannelAccessMode-r16 = "semistatic" is provided | | |
|---|---|---|
| Bit field mapped to index | Channel Access Type | COT initiator |
| 1 | 9 us sensing within a 25 us interval as defined in Clause 4.3 in TS 37.213 | UE |
| 2 | No sensing as defined in Clause 4.3 in TS 37.213 | gNB |
| 3 | 9 us sensing within a 25 us interval as defined in Clause 4.3 in TS 37.213 | gNB |

Figure 10:
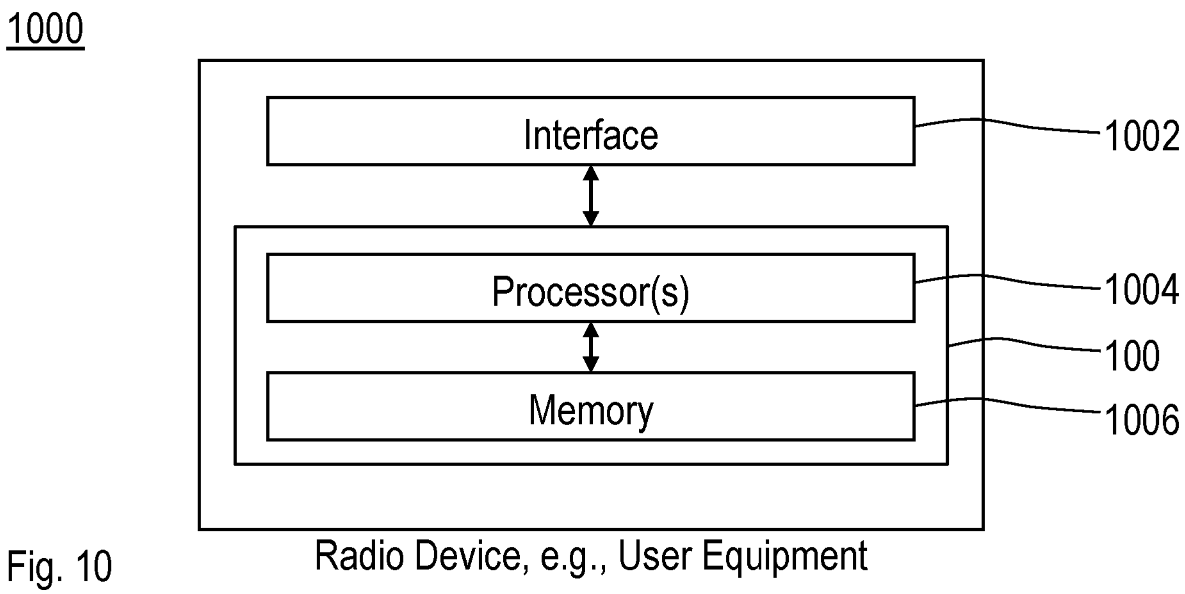
FIG. 10 shows a schematic block diagram of a radio device embodying the device of FIG. 1.

2. Terminology: Some of the terminology is interchangeably used.
   a. UE-COT initiating transmission=UE transmission at boundary (after idle period)=UE's transmission at beginning of FFP=UE's transmission at the beginning of COT
   b. UE's non-initiating transmission=UE's transmission in the COT or valid FFP period but not at beginning of COT/FFP=UL transmission allocated/scheduled after UE FFP boundary
   c. UE-COT or UE-FFP means COT initiated by the UE
   d. gNB-COT or gNB-FFP means COT initiated by the gNB
3. UE's transmission
   a. UE's transmission is UL transmission which can be PUSCH or PUCCH based transmission
      a. The example of PUCCH based transmission is transmission of HARQ-ACK which is feedback for PDSCH transmission
   b. PUSCH transmission is allocated by DCI format 0_0 or 0_1 or 0_2
   c. HARQ-ACK resource (PUCCH based transmission) is allocated by DCI format 1_0 or 1_1 or 1_2
   d. In these DCIs (option b. and c.), we indicate index in bit-field (2-bit or 3-bit) based on rules defined in above embodiments
      a. Based on indicated index in DCI, UE is asked to do UL transmission in e.g.,
         i. gNB-COT
         ii. UE-COT
            1. As an initiating transmission
               a. LBT of 9 μs sensing applies
            2. As a non-initiating transmission
               a. LBT of 0 or 9 μs sensing applies FIG. 10 shows a schematic block diagram for an embodiment of the device 100. The device 100 comprises processing circuitry, e.g., one or more processors 1004 for performing the method 300 and memory 1006 coupled to the processors 1004. For example, the memory 1006 may be encoded with instructions that implement at least one of the modules 102, 104 and 106.

The one or more processors 1004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1006, UE functionality. For example, the one or more processors 1004 may execute instructions stored in the memory 1006. Such functionality may include providing various features and steps discussed herein, including any of the benefits disclosed herein. The expression "the device being operative to perform an action" may denote the device 100 being configured to perform the action.

As schematically illustrated in FIG. 10, the device 100 may be embodied by a radio device 1000, e.g., functioning as a UE. The UE 1000 comprises a radio interface 1002 coupled to the device 100 for radio communication with one or more base stations, e.g., functioning as a network node of the RAN.

Figure 11:
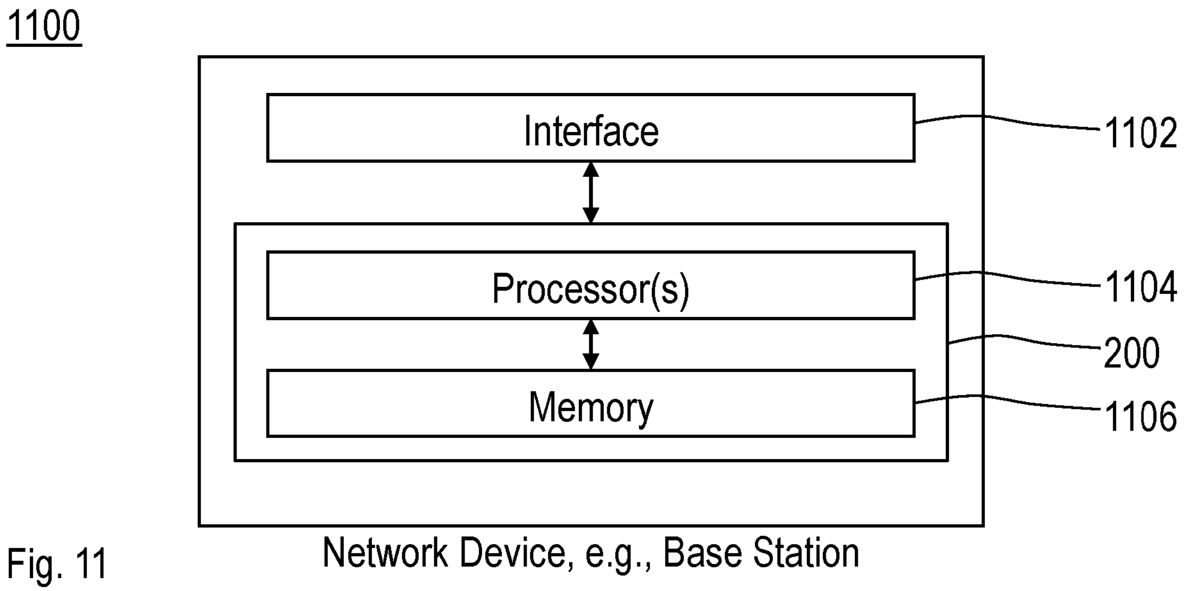
FIG. 11 shows a schematic block diagram of a network node embodying the device of FIG. 2.

FIG. 11 shows a schematic block diagram for an embodiment of the device 200. The device 200 comprises processing circuitry, e.g., one or more processors 1104 for performing the method 400 and memory 1106 coupled to the processors 1104. For example, the memory 1106 may be encoded with instructions that implement at least one of the modules 202, 204 and 206.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1106, base station functionality. For example, the one or more processors 1104 may execute instructions stored in the memory 1106. Such functionality may include providing various features and steps discussed herein, including any of the benefits disclosed herein. The expression "the device being operative to perform an action" may denote the device 200 being configured to perform the action.

As schematically illustrated in FIG. 11, the device 200 may be embodied by a network node 1100, e.g., functioning as a base station (e.g., gNB). The network node 1100 comprises a radio interface 1102 coupled to the device 200 for radio communication with one or more radio devices, e.g., functioning as the UE.

Figure 12:
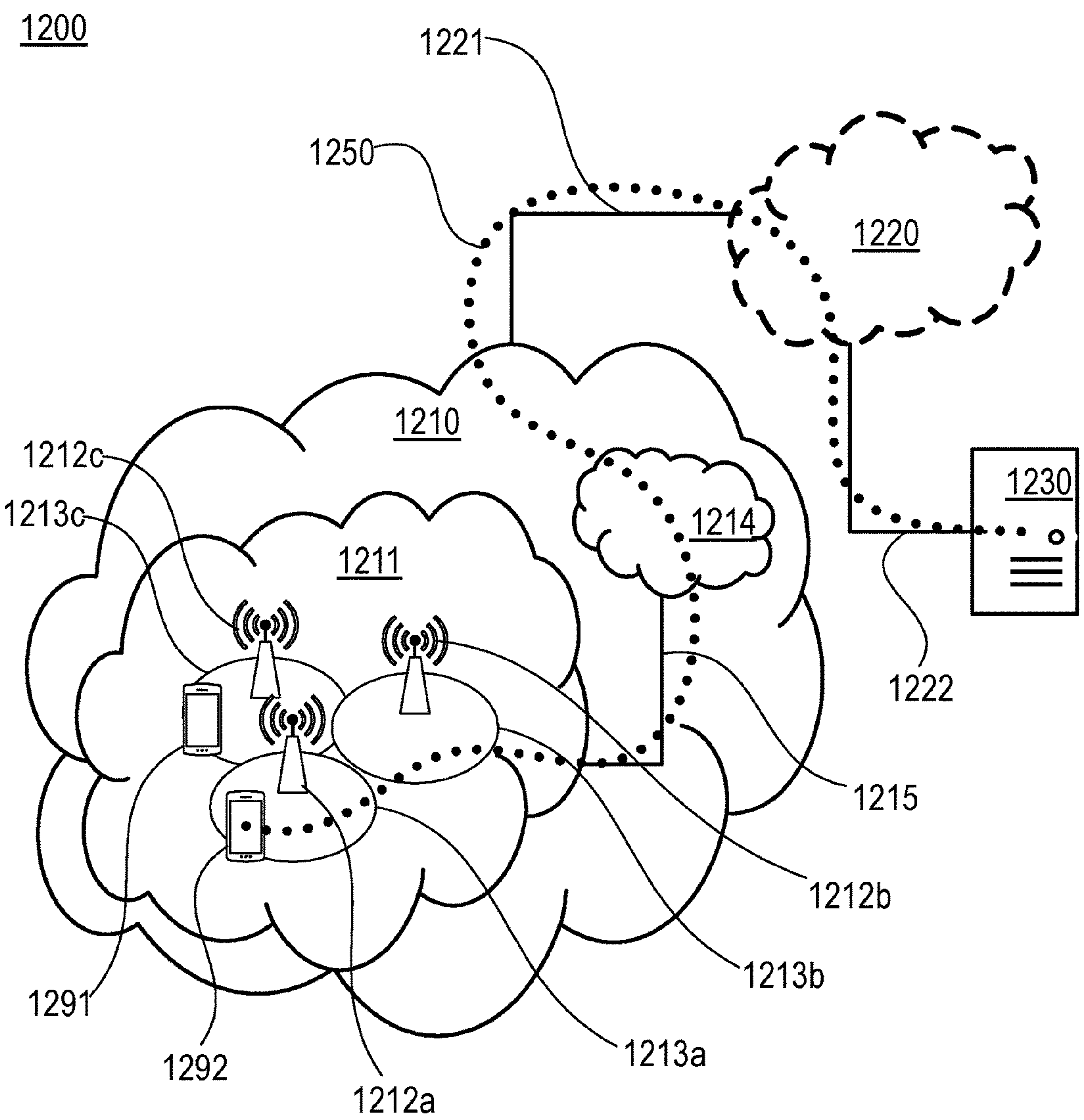
FIG. 12 schematically illustrates an example telecommunication network connected via an intermediate network to a host computer.

With reference to FIG. 12, in accordance with an embodiment, a communication system 1200 includes a telecommunication network 1210, such as a 3GPP-type cellular network, which comprises an access network 1211, such as a radio access network, and a core network 1214. The access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to the core network 1214 over a wired or wireless connection 1215. A first user equipment (UE) 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Any of the base stations 1212 and the UEs 1291, 1292 may embody the device 100.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system 1200 of FIG. 12 as a whole enables connectivity between one of the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, a base station 1212 need not be informed about the past routing of an incoming downlink communication with data originating from a host computer 1230 to be forwarded (e.g., handed over) to a connected UE 1291. Similarly, the base station 1212 need not be aware of the future routing of an outgoing uplink communication originating from the UE 1291 towards the host computer 1230.

By virtue of the method 300 and 400 being performed by any one of the UEs 1291 or 1292 and/or any one of the base stations 1212, the performance or range of the OTT connection 1250 can be improved, e.g., in terms of increased throughput and/or reduced latency. More specifically, the host computer 1230 may indicate to the network node 200 and/or the radio device 100 (e.g., on an application layer) the QoS of the traffic or any other trigger for URLLC, i.e., a trigger for using the technique.

Example implementations, in accordance with an embodiment of the UE, base station and host computer discussed in the preceding paragraphs, will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data, which is transmitted using the OTT connection 1350. The user data may depend on the location of the UE 1330. The user data may comprise auxiliary information or precision advertisements (also: ads) delivered to the UE 1330. The location may be reported by the UE 1330 to the host computer, e.g., using the OTT connection 1350, and/or by the base station 1320, e.g., using a connection 1360.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a UE 1330 located in a coverage area (not shown in FIG. 13) served by the base station 1320. The communication interface 1326 may be configured to facilitate a connection 1360 to the host computer 1310. The connection 1360 may be direct, or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
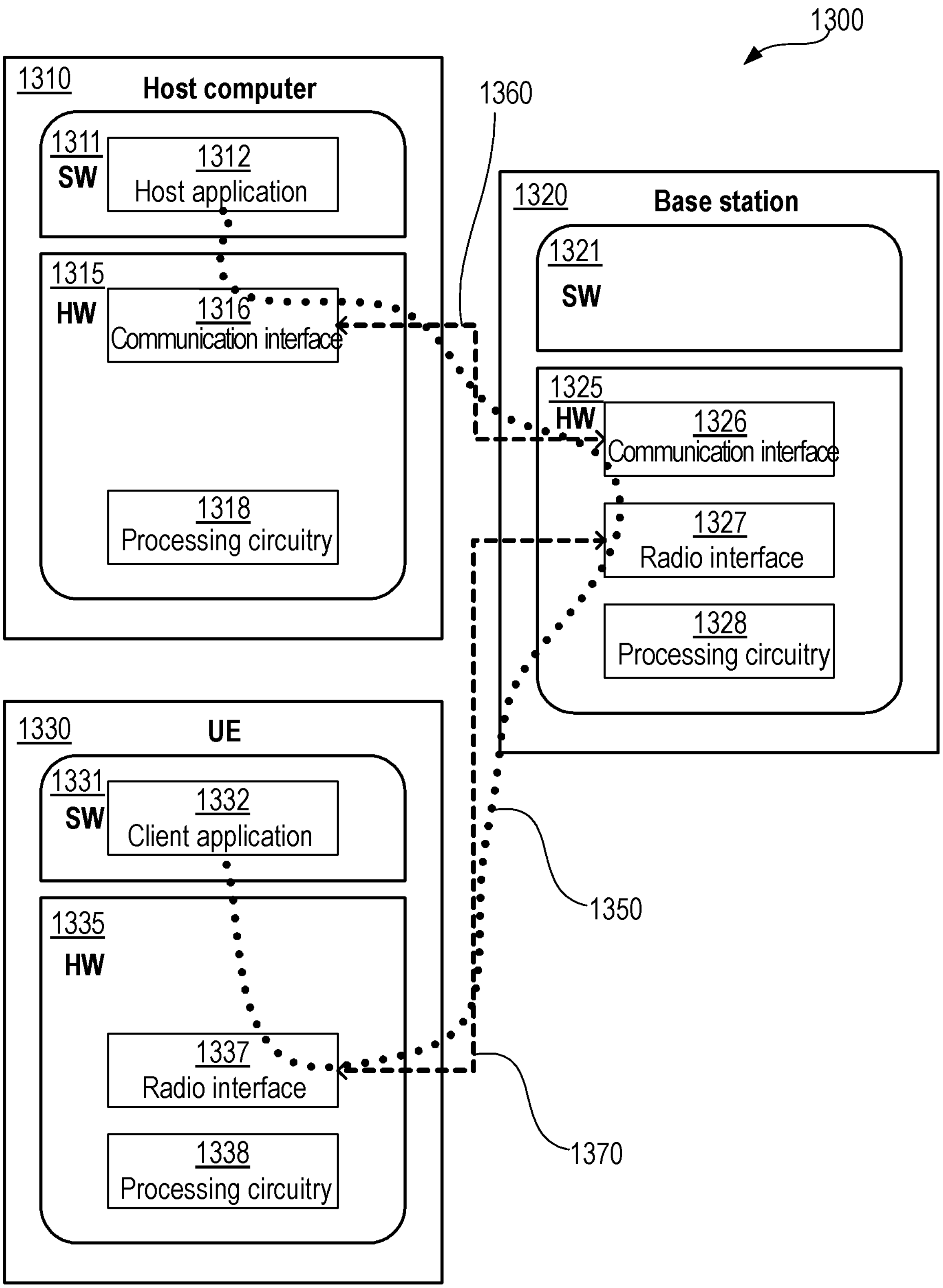
FIG. 13 shows a generalized block diagram of a host computer communicating via a base station or radio device functioning as a gateway with a user equipment over a partially wireless connection.

It is noted that the host computer 1310, base station 1320 and UE 1330 illustrated in FIG. 13 may be identical to the host computer 1230, one of the base stations 1212*a*, 1212*b*, 1212*c* and one of the UEs 1291, 1292 of FIG. 12, respectively. This is to say, the inner workings of these entities may be as shown in FIG. 13, and, independently, the surrounding network topology may be that of FIG. 12.

In FIG. 13, the OTT connection 1350 has been drawn abstractly to illustrate the communication between the host computer 1310 and the UE 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1350 between the host computer 1310 and UE 1330, in response to variations in the measurement results. The measurement procedure and/or the network functionality for reconfiguring the OTT connection 1350 may be implemented in the software 1311 of the host computer 1310 or in the software 1331 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer's 1310 measurements of throughput, propagation times, latency and the like. The measurements may be implemented in that the software 1311, 1331 causes messages to be transmitted, in particular empty or "dummy" messages, using the OTT connection 1350 while it monitors propagation times, errors etc.

Figure 14:
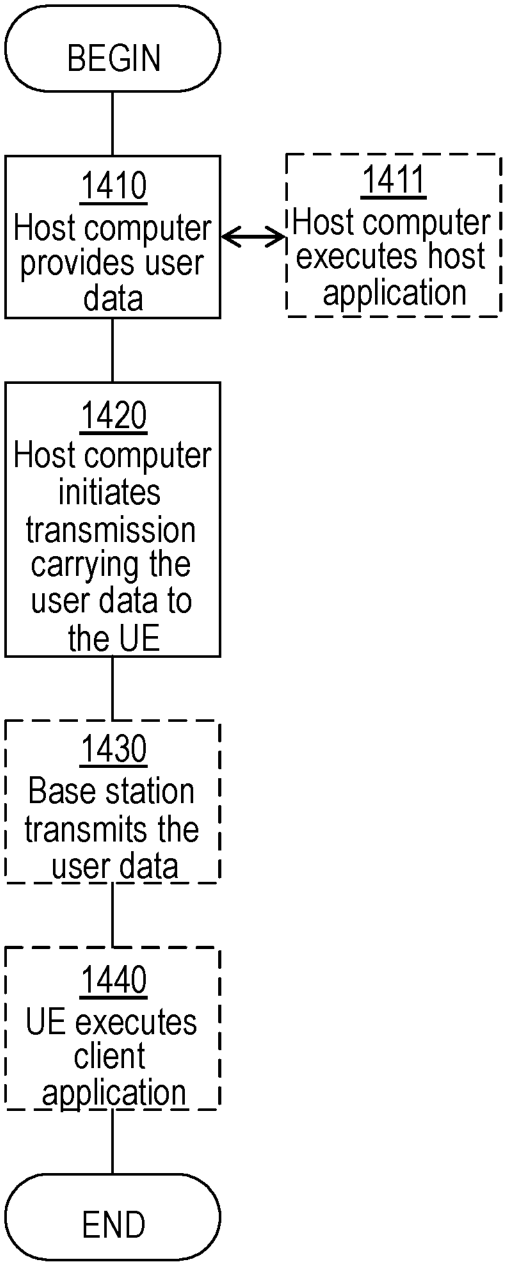
FIGS. 14 and 15 show flowcharts for methods implemented in a communication system including a host computer, a base station or radio device functioning as a gateway and a user equipment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this paragraph. In a first step 1410 of the method, the host computer provides user data. In an optional substep 1411 of the first step 1410, the host computer provides the user data by executing a host application. In a second step 1420, the host computer initiates a transmission carrying the user data to the UE. In an optional third step 1430, the base station transmits to the UE the user data which was carried in the transmission that the host computer initiated, in accordance with the teachings of the embodiments described throughout this disclosure. In an optional fourth step 1440, the UE executes a client application associated with the host application executed by the host computer.

Figure 15:
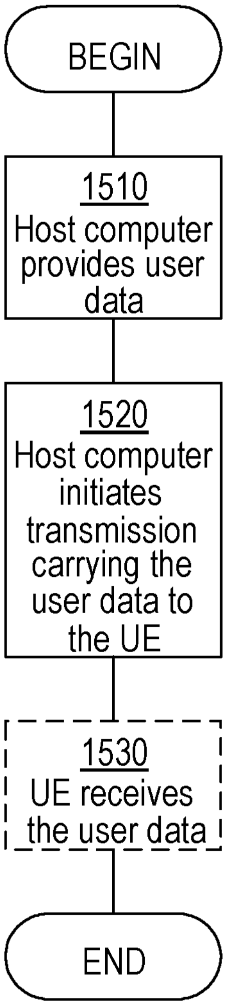

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this paragraph. In a first step 1510 of the method, the host computer provides user data. In an optional substep (not shown) the host computer provides the user data by executing a host application. In a second step 1520, the host computer initiates a transmission carrying the user data to the UE. The transmission may pass via the base station, in accordance with the teachings of the embodiments described throughout this disclosure. In an optional third step 1530, the UE receives the user data carried in the transmission.

As has become apparent from above description, at least some embodiments of the technique allow for the transmission in a COT based on some rules, which helps to eliminate non-deterministic behavior when multiple COTs are available to a node (e.g., UE and/or gNB).

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized 10 that the invention should be limited only by the scope of the above enumerated embodiments.

LIST OF EMBODIMENTS

1. A method (300) of radio communicating between a radio device (100; 1000; 1291; 1292; 1330) and a network node (200) of a radio access network, RAN, using a temporal radio resource associated with a channel occupancy time, COT, the method (300) performed by the radio device (100; 1000; 1291; 1292; 1330) comprising or initiating at least one of the steps of:
   determining (302) if a first COT is initiated by the radio device (100; 1000; 1291; 1292; 1330);
   determining (304) if a second COT is initiated by the network node (200); and
   radio communicating (306) with the network node (200) in the temporal radio resource associated with the first COT or the second COT depending on the determinations (302, 304).
   The determinations may relate to a result of the step of determining if the first COT is initiated by the radio device and a result of the step of determining if the second COT is initiated by the network node.
2. The method (300) of Embodiment 1, wherein the radio communicating (306) comprises:
   determining, depending on the determinations (302, 304), whether to use the temporal radio resource associated with first COT or the second COT for the radio communicating (306).
3. The method (300) of Embodiment 1 or 2, wherein the radio communicating (306) comprises:
   transmitting (306) to the network node (200) in the temporal radio resource associated with the first COT or the second COT depending on the determinations (302, 304).
   The radio device may transmit in the temporal radio resource associated with either the first COT or the second COT according to one or more selection rules, e.g., restriction rules. The section rules may be evaluated (e.g., for determining whether to use the first or the second COT) based on the determinations.

4. The method (300) of any one of Embodiments 1 to 3, wherein the radio communicating (306) comprises:
receiving (306) from the network node (200) in the temporal radio resource associated with the first COT or the second COT depending on the determinations (302, 304).
The radio device may receive in the temporal radio resource associated with either the first COT or the second COT according to one or more selection rules, e.g., restriction rules. The section rules may be evaluated (e.g., for determining whether to use the first or the second COT) based on the determinations.

5. The method (300) of any one of Embodiments 1 to 4, wherein the determinations (302, 304) are indicative of both the first COT being initiated by the radio device (100; 1000; 1291; 1292; 1330) and the second COT being initiated by the network node (200).

6. The method (300) of any one of Embodiments 1 to 5, wherein determining (302) that the first COT is initiated by the radio device (100; 1000; 1291; 1292; 1330) comprises:
performing a clear channel assessment, CCA; and
transmitting in the first COT if the CCA is indicative of clearance.

7. The method (300) of any one of Embodiments 1 to 6, wherein determining (304) that the second COT is initiated by the network node (200) comprises receiving a downlink transmission from the network node (200) in the second COT.

8. The method (300) of any one of Embodiments 1 to 7, wherein at least one or each of the first COT and the second COT uses radio spectrum shared with at least one of a further RAN and a further radio access technology, RAT, other than a RAT used by the RAN. For example, the used radio spectrum is unlicensed.

9. The method (300) of any one of Embodiments 1 to 8, wherein the temporal radio resource associated with the respective COT comprise an idle period of a fixed frame period, FFP, the FFP comprising the respective COT and the idle period.

10. The method (300) of any one of Embodiments 1 to 9, wherein the radio device (100; 1000; 1291; 1292; 1330) refrains from transmitting in the temporal radio resource associated with the second COT if the first COT is initiated by the radio device (100; 1000; 1291; 1292; 1330).
The radio device may refrain from transmitting in the temporal radio resource associated with second COT if the first COT is initiated by the radio device and the second COT is initiated by the network node.

11. The method (300) of any one of Embodiments 1 to 9, wherein the radio device (100; 1000; 1291; 1292; 1330) transmits in the temporal radio resource associated with second COT if the first COT is initiated by the radio device (100; 1000; 1291; 1292; 1330).
The radio device may transmit in the temporal radio resource associated with second COT if the first COT is initiated by the radio device and the second COT is initiated by the network node.

12. The method (300) of any one of Embodiments 1 to 11, wherein the radio device (100; 1000; 1291; 1292; 1330) refrains from receiving in the temporal radio resource associated with the first COT if the second COT is initiated by the network node (200).
The network node may refrain from transmitting in the temporal radio resource associated with first COT if the first COT is initiated by the radio device and the second COT is initiated by the network node.

13. The method (300) of any one of Embodiments 1 to 11, wherein the radio device (100; 1000; 1291; 1292; 1330) receives in the temporal radio resource associated with first COT if the second COT is initiated by the network node (200).
The network node may transmit in the temporal radio resource associated with first COT if the first COT is initiated by the radio device and the second COT is initiated by the network node.

14. The method (300) of any one of Embodiments 1 to 13, further comprising or initiating the step:
receiving a control message from the network node (200), the control message being indicative of at least one restriction on using the temporal radio resource associated with the first COT and/or on using the temporal radio resource associated with the second COT.

15. The method (300) of Embodiment 14, wherein the step of radio communicating (306) with the network node (200) comprises radio communicating (306) in the temporal radio resource associated with the first COT or the second COT according to the at least one restriction depending on the determinations (302, 304).
The at least one restriction may depend on if the first COT is initiated by the radio device and/or if the second COT is initiated by the network node.

16. The method (300) of Embodiment 14 or 15, wherein the at least one restriction
a. excludes the radio device (100; 1000; 1291; 1292; 1330) from transmitting in the temporal radio resource associated with the second COT, if the radio device (100; 1000; 1291; 1292; 1330) has initiated the first COT; or
b. allows the radio device (100; 1000; 1291; 1292; 1330) to transmit in the temporal radio resource associated with the second COT, if the radio device (100; 1000; 1291; 1292; 1330) has initiated the first COT; or
c. excludes the network node (200) from transmitting in the temporal radio resource associated with the first COT, if the network node (200) has initiated the second COT; or
d. allows the network node (200) to transmit in the temporal radio resource associated with the first COT, if the network node (200) has initiated the second COT; or
e. comprises a combination of features a and c; or
f. comprises a combination of features a and d; or
g. comprises a combination of features b and c; or
h. comprises a combination of features b and d.

17. The method (300) of any one of Embodiments 14 to 16, wherein the control message comprises radio resource control, RRC, signaling.

18. The method (300) of any one of Embodiments 14 to 17, wherein the control message comprises downlink control information, DCI.

19. The method (300) of any one of Embodiments 14 to 18, wherein the control message comprises at least one of scheduling information, unicast DCI, group-common DCI, and a DCI specific for the at least one restriction.

20. The method (300) of any one of Embodiments 14 to 19, wherein the radio device is configured by the network node (200) with a RRC table, the control message being indicative of at least one entry in the table corresponding to the at least one restriction.
21. The method (300) of any one of Embodiments 14 to 20, wherein the at least one restriction is indicated in scheduling DCI for a physical uplink control channel, PUSCH, optionally using a field for Channel Access Type or CP extension, and/or using DCI format 0_0 or 0_1.
22. The method (300) of any one of Embodiments 14 to 21, wherein the at least one restriction is indicated in a restriction field of the DCI, optionally using DCI format 0_0, 0_1, or 0_2.
23. The method (300) of any one of Embodiments 14 to 22, wherein the at least one restriction is indicated in a COT duration indicator in DCI format 2_0, or in a restriction field of DCI optionally based on DCI format 2_0, or in a restriction field in cancellation DCI optionally based on DCI format 2_4.
24a. The method (300) of any one of Embodiments 14 to 23, wherein the at least one restriction is indicated in a COT duration indicator in DCI format 2_0, or in a restriction field of DCI optionally based on DCI format 2_0, or in a restriction field in cancellation DCI optionally based on DCI format 2_4.
24b. The method (300) of any one of Embodiments 14 to 23, wherein the control message is indicative of a reference resource over which an uplink transmission is to be cancelled, optionally wherein the reference resource corresponds to an excluded temporal radio resource associated with one of the first COT and the second COT or an excluded idle period associated with one of the first COT and the second COT.
25. The method (300) of any one of Embodiments 14 to 24b, wherein the control message is indicative of the at least one restriction for each of at least two COT configurations, optionally wherein the least two COT configurations relate to at least two different first COTs initiated by the radio device and/or at least two different second COTs initiated by the network node.
26. The method (300) of any one of Embodiments 14 to 25, wherein the control message is further indicative of a time period or a number of idle periods or a number of FFPs during which the at least one restriction is applicable.
27. The method (300) of any one of Embodiments 14 to 26, wherein the control message is further indicative of
at least one label (702) for the temporal radio resource or idle period associated with the second COT, and/or
at least one label (704) for the temporal radio resource or idle period associated with the first COT, and/or
at least one label (706) for a reference resource or resource
during which the at least one restriction is applicable.
28. The method (300) of any one of Embodiments 14 to 27, wherein the control message is further indicative of an identifier of the COT to which the at least one restriction is applicable.
29. The method (300) of any one of Embodiments 1 to 28, further comprising or initiating:
receiving in the first COT (801) a group-common transmission (804), optionally the control message, from the network node (200), in response to a transmission (802) of the radio device (100; 1000; 1291; 1292; 1330) initiating the first COT (801), the group-common transmission (804) being indicative of an identifier of the first COT (801).
30. The method (300) of Embodiment 29, wherein the group-common transmission (804) comprises a flag that is indicative of whether the group-common transmission (804) is the second COT or is a part of a COT initiated by a radio device (100; 1000; 1291; 1292; 1330), optionally indicative of if the group-common transmission (804) is part of the first COT.
31. The method (300) of Embodiment 29 or 30, wherein the radio device (100; 1000; 1291; 1292; 1330) associates the temporal radio resource to a COT, optionally to the first or second COT, based on the identifier, optionally before determining whether to use the temporal radio resource based on the at least one restriction.
32a. The method (300) of any one of Embodiments 1 to 31, wherein the control message and/or the group-common transmission (804) is, for each of a plurality of COTs, further indicative of an association of allowed radio devices (100; 1000; 1291; 1292; 1330) that are allowed to transmit in the temporal radio resource associated with the respective COT out of the plurality of COTs and/or further indicative of an association of excluded radio devices (100; 1000; 1291; 1292; 1330) that are excluded from transmitting in the temporal radio resource associated with the respective COT out of the plurality of COTs.
32b. The method (300) of any one of Embodiments 1 to 31, further comprising or initiating:
receiving a transmission (804) from the network node (200), wherein the transmission (804) is indicative of whether or not the radio device (100; 1000; 1291; 1292; 1330) is allowed to transmit (306) in the temporal radio resource associated with a COT.
33. The method (300) of Embodiment 32b, wherein the COT is initiated by another radio device (100; 1000; 1291; 1292; 1330) in the RAN other than the radio device (100; 1000; 1291; 1292; 1330).
34. The method (300) of Embodiment 32b or 33, wherein the transmission (804) from the network node is a group-common transmission or a unicast transmission and/or a transmission initiating the second COT.
35. The method (300) of any one of Embodiments 31 to 34, wherein the radio device (100; 1000; 1291; 1292; 1330) is restricted to transmit in the COT initiated by another radio device (100; 1000; 1291; 1292; 1330) in temporal radio resources scheduled by the network node.
36. The method (300) of any one of Embodiments 1 to 35, wherein the control message or a further control message received at the radio device (100; 1000; 1291; 1292; 1330) from the network node (200) or a transmission (902; 906) initiating the second COT received at the radio device (100; 1000; 1291; 1292; 1330) from the network node (200) is indicative of whether the temporal radio resource associated with the first COT or the second COT is to be used for the transmission (306; 908).
37. The method (300) of Embodiment 36, wherein the transmission (306; 908) coincides with a beginning of an FFP and/or a transmission for initiating the first COT.
38. The method (300) of any one of Embodiments 1 to 37, wherein the first COT is active or occupied by the radio device (100; 1000; 1291; 1292; 1330), the method (300) further comprising or initiating:

receiving a control message from the network node (200) indicative of cancelling the first COT.

39. A method (400) of radio communicating between a radio device (100; 1000; 1291; 1292; 1330) and a network node (200) of a radio access network, RAN, using a temporal radio resource associated with a channel occupancy time, COT, the method (300) performed by the network node (200) comprising or initiating at least one of the steps of:

determining (402) if a first COT is initiated by the radio device (100; 1000; 1291; 1292; 1330);

determining (404) if a second COT is initiated by the network node (200); and radio communicating (406) with the radio device (100; 1000; 1291; 1292; 1330) in the temporal radio resource associated with the first COT or the second COT depending on the determinations (402, 404).

The determinations may relate to a result of the step of determining if the first COT is initiated by the radio device and a result of the step of determining if the second COT is initiated by the network node.

40. The method (400) of Embodiment 39, wherein the radio communicating (406) comprises:

determining, depending on the determinations (402, 404), whether to use the temporal radio resource associated with first COT or the second COT for the radio communicating (406).

41. The method (400) of Embodiment 39 or 40, wherein the radio communicating (406) comprises:

transmitting (406) to the radio device (100; 1000; 1291; 1292; 1330) in the temporal radio resource associated with the first COT or the second COT depending on the determinations (402, 404).

The network node may transmit in the temporal radio resource associated with either the first COT or the second COT according to one or more selection rules, e.g., restriction rules. The section rules may be evaluated (e.g., for determining whether to use the first or the second COT) based on the determinations.

42. The method (400) of any one of Embodiments 39 to 41, wherein the radio communicating (406) comprises:

receiving (406) from the radio device (100; 1000; 1291; 1292; 1330) in the temporal radio resource associated with the first COT or the second COT depending on the determinations (402, 404).

The network node may receive in the temporal radio resource associated with either the first COT or the second COT according to one or more selection rules, e.g., restriction rules. The section rules may be evaluated (e.g., for determining whether to use the first or the second COT) based on the determinations.

43. The method (400) of any one of Embodiments 39 to 42, wherein the determinations (302, 304) are indicative of both the first COT being initiated by the radio device (100; 1000; 1291; 1292; 1330) and the second COT being initiated by the network node (200).

44. The method (400) of any one of Embodiments 39 to 43, wherein determining (402) that the first COT is initiated by the radio device (100; 1000; 1291; 1292; 1330) comprises receiving an uplink transmission from the radio device (100; 1000; 1291; 1292; 1330) in the first COT.

45. The method (400) of any one of Embodiments 39 to 44, wherein determining (404) that the second COT is initiated by the radio device (100; 1000; 1291; 1292; 1330) comprises:

performing a clear channel assessment, CCA; and transmitting in the second COT if the CCA is indicative of clearance.

46. The method (400) of any one of Embodiments 39 to 45, wherein at least one or each of the first COT and the second COT uses radio spectrum shared with at least one of a further RAN and a further radio access technology, RAT, other than a RAT used by the RAN. For example, the used radio spectrum is unlicensed.

47. The method (400) of any one of Embodiments 39 to 46, wherein the temporal radio resource associated with the respective COT comprise an idle period of a fixed frame period, FFP, the FFP comprising the respective COT and the idle period.

48. The method (400) of any one of Embodiments 39 to 47, wherein the network node (200) refrains from receiving in the temporal radio resource associated with the second COT if the first COT is initiated by the radio device (100; 1000; 1291; 1292; 1330).

The radio device may refrain from transmitting in the temporal radio resource associated with second COT if the first COT is initiated by the radio device and the second COT is initiated by the network node.

49. The method (400) of any one of Embodiments 39 to 47, wherein the network node (200) receives in the temporal radio resource associated with second COT if the first COT is initiated by the radio device (100; 1000; 1291; 1292; 1330).

The radio device may transmit in the temporal radio resource associated with second COT if the first COT is initiated by the radio device and the second COT is initiated by the network node.

50. The method (400) of any one of Embodiments 39 to 49, wherein the network node (200) refrains from transmitting in the temporal radio resource associated with the first COT if the second COT is initiated by the network node (200).

The network node may refrain from transmitting in the temporal radio resource associated with first COT if the first COT is initiated by the radio device and the second COT is initiated by the network node.

51. The method (400) of any one of Embodiments 39 to 49, wherein the network node (200) transmits in the temporal radio resource associated with first COT if the second COT is initiated by the network node (200).

The network node may transmit in the temporal radio resource associated with first COT if the first COT is initiated by the radio device and the second COT is initiated by the network node.

52. The method (400) of any one of Embodiments 39 to 51, further comprising the steps or features of any one of Embodiments 2 to 38 or any step or feature corresponding thereto.

53. A computer program product comprising program code portions for performing the steps of any one of the Embodiments 1 to 38 and/or 39 to 52 when the computer program product is executed on one or more computing devices (1004; 1104), optionally stored on a computer-readable recording medium (1006; 1106).

54. A radio device (100; 1000; 1291; 1292; 1330) comprising memory operable to store instructions and processing circuitry operable to execute the instructions, such that the radio device (100; 1000; 1291; 1292; 1330) is operable to at least one of:

determine (302) if a first COT is initiated by the radio device (100; 1000; 1291; 1292; 1330);

determine (304) if a second COT is initiated by the network node (200); and radio communicate (306) with the network node (200) in the temporal radio resource associated with the first COT or the second COT depending on the determinations (302, 304).

55. The radio device (100; 1000; 1291; 1292; 1330) of Embodiment 54, further operable to perform the steps of any one of Embodiments 2 to 38.

56. A radio device (100; 1000; 1291; 1292; 1330) for radio communicating between a radio device (100; 1000; 1291; 1292; 1330) and a network node (200) of a radio access network, RAN, using a temporal radio resource associated with a channel occupancy time, COT, the radio device (100; 1000; 1291; 1292; 1330) being configured to at least one of:

determine (302) if a first COT is initiated by the radio device (100; 1000; 1291; 1292; 1330);

determine (304) if a second COT is initiated by the network node (200); and radio communicate (306) with the network node (200) in the temporal radio resource associated with the first COT or the second COT depending on the determinations (302, 304).

57. The radio device (100; 1100; 1291; 1292; 1330) of Embodiment 56, further configured to perform the steps of any one of Embodiments 2 to 38.

58. A user equipment, UE, (100; 1100; 1391; 1392; 1430) configured to communicate with a base station (200; 1200; 1312; 1420) or with a radio device functioning as a gateway, the UE (100; 1000; 1291; 1292; 1330) comprising a radio interface (1102; 1437) and processing circuitry (1104; 1438) configured to at least one of:

determine (302) if a first COT is initiated by the radio device (100; 1000; 1291; 1292; 1330);

determine (304) if a second COT is initiated by the network node (200); and radio communicate (306) with the network node (200) in the temporal radio resource associated with the first COT or the second COT depending on the determinations (302, 304).

59. The UE (100; 1100; 1391; 1392; 1430) of Embodiment 58, wherein the processing circuitry (1104; 1438) is further configured to execute the steps of any one of Embodiments 2 to 38.

60. A network node (200) comprising memory operable to store instructions and processing circuitry operable to execute the instructions, such that the network node (200) is operable to at least one of:

determine (402) if a first COT is initiated by the radio device (100; 1000; 1291; 1292; 1330);

determine (404) if a second COT is initiated by the network node (200); and radio communicate (406) with the radio device (100; 1000; 1291; 1292; 1330) in the temporal radio resource associated with the first COT or the second COT depending on the determinations (402, 404).

61. The network node (200) of Embodiment 29, further operable to perform any one of the steps of any one of Embodiments 39 to 52.

62. A network node (200) for radio communicating between a radio device (100; 1000; 1291; 1292; 1330) and the network node (200) of a radio access network, RAN, using a temporal radio resource associated with a channel occupancy time, COT, configured to at least one of:

determine (402) if a first COT is initiated by the radio device (100; 1000; 1291; 1292; 1330);

determine (404) if a second COT is initiated by the network node (200); and radio communicate (406) with the radio device (100; 1000; 1291; 1292; 1330) in the temporal radio resource associated with the first COT or the second COT depending on the determinations (402, 404).

63. The network node (200) of Embodiment 62, further configured to perform the steps of any one of Embodiment 39 to 52.

64. A base station (200; 1100; 1212; 1320) configured to communicate with a user equipment, UE, the base station (200; 1200; 1312; 1420) comprising a radio interface (1202; 1427) and processing circuitry (1204; 1428) configured to at least one of:

determine (402) if a first COT is initiated by the radio device (100; 1000; 1291; 1292; 1330);

determine (404) if a second COT is initiated by the network node (200); and radio communicate (406) with the radio device (100; 1000; 1291; 1292; 1330) in the temporal radio resource associated with the first COT or the second COT depending on the determinations (402, 404).

65. The base station (200; 1100; 1212; 1320) of Embodiment 33, wherein the processing circuitry (1204; 1428) is further configured to execute the steps of any one of Embodiments 39 to 52.

66. A communication system (1200; 1300) including a host computer (1230; 1310) comprising:

processing circuitry (1318) configured to provide user data; and a communication interface (1316) configured to forward user data to a cellular or ad hoc radio network (1210) for transmission to a user equipment, UE, (100; 1000; 1291; 1292; 1330) wherein the UE (100; 1000; 1291; 1292; 1330) comprises a radio interface (1102; 1437) and processing circuitry (1104; 1438), the processing circuitry (1104; 1438) of the UE (100; 1000; 1291; 1292; 1330) being configured to execute the steps of any one of Embodiments 1 to 38.

67. The communication system (1200; 1300) of Embodiment 66, further including the UE (100; 1100; 1391; 1392; 1430).

68. The communication system (1200; 1300) of Embodiment 66 or 67, wherein the radio network (1210) further comprises a base station (200; 1200; 1312; 1420), or a radio device (100; 1100; 1391; 1392; 1430) functioning as a gateway, which is configured to communicate with the UE (100; 1100; 1391; 1392; 1430).

69. The communication system (1200; 1300) of Embodiment 67, wherein the base station (200; 1200; 1312; 1420), or the radio device (100; 1100; 1391; 1392; 1430) functioning as a gateway, comprises processing circuitry (1204; 1428), which is configured to execute the steps of Embodiment 39 to 52.

70. The communication system (1300; 1400) of any one of Embodiments 66 to 68, wherein:

the processing circuitry (1418) of the host computer (1330; 1410) is configured to execute a host application (1412), thereby providing the user data; and the processing circuitry (1104; 1438) of the UE (100; 1100; 1391; 1392; 1430) is configured to execute a client application (1432) associated with the host application (1412).

71. The method of embodiments 1 or 39, wherein determination (302, 304) is based on information in a DCI message.

72. The method of embodiment 71, wherein the DCI indicates whether the first COT is initiated by the radio device and/or whether the second COT is initiated by the network node.

73. The method of embodiment 71 or 72, wherein the DCI Format is used for scheduling of PUSCH.

74. The method of embodiments 71-73, wherein the indication whether the first COT is initiated by the radio device and/or whether the second COT is initiated by the network node is based on a bit field mapped to index indicating the channel access type in table included in the DCI message.

75. The method of embodiment 74, wherein the table includes a row indicating whether a COT is gNB or UE initiated.

76. The radio device (100; 1100; 1291; 1292; 1330) of Embodiment 56, further configured to perform the steps of any one of Embodiments 71 to 75.

77. The network node (200) of Embodiment 62, further configured to perform the steps of any one of Embodiment 71 to 75.

78. The base station (200; 1100; 1212; 1320) of Embodiment 33, wherein the processing circuitry (1204; 1428) is further configured to execute the steps of any one of Embodiments 71 to 75.

The invention claimed is:

1. A method of radio communicating between a radio device and a network node of a radio access network (RAN) using a temporal radio resource associated with a channel occupancy time (COT) the method performed by the radio device comprising or initiating at least one of the steps of:

determining if a first COT is initiated by the radio device;

determining if a second COT is initiated by the network node; and radio communicating with the network node in the temporal radio resource associated with the first COT or the second COT depending on the determinations, the radio communicating comprising:

the radio device receiving in the temporal radio resource associated with the first COT if the second COT is initiated by the network node; and the radio device transmitting in the temporal radio resource associated with the second COT if the first COT is initiated by the radio device.

2. The method of claim 1, wherein the radio communicating comprises:

determining, depending on the determinations, whether to use the temporal radio resource associated with first COT or the second COT for the radio communicating.

3. The method of claim 1, wherein the radio communicating comprises:

transmitting to the network node in the temporal radio resource associated with the first COT or the second COT depending on the determinations.

4. The method of claim 1, wherein the determinations are indicative of both the first COT being initiated by the radio device and the second COT being initiated by the network node.

5. The method of claim 1, wherein determining that the first COT is initiated by the radio device comprises:

performing a clear channel assessment (CCA); and transmitting in the first COT if the CCA is indicative of clearance.

6. The method of claim 1, wherein determining that the second COT is initiated by the network node comprises receiving a downlink transmission from the network node in the second COT.

7. The method of claim 1, wherein at least one or each of the first COT and the second COT uses radio spectrum shared with at least one of a further RAN and a further radio access technology (RAT) other than a RAT used by the RAN.

8. The method of claim 1, wherein the radio device refrains from transmitting in the temporal radio resource associated with the second COT if the first COT is initiated by the radio device.

9. The method of claim 1, wherein the radio device refrains from receiving in the temporal radio resource associated with the first COT if the second COT is initiated by the network node.

10. A method of radio communicating between a radio device and a network node of a radio access network (RAN) using a temporal radio resource associated with a channel occupancy time (COT) the method performed by the network node comprising or initiating at least one of the steps of:

determining if a first COT is initiated by the radio device;

determining if a second COT is initiated by the network node; and radio communicating with the radio device in the temporal radio resource associated with the first COT or the second COT depending on the determinations, the radio communicating comprising:

the radio device receiving in the temporal radio resource associated with the first COT if the second COT is initiated by the network node; and the radio device transmitting in the temporal radio resource associated with the second COT if the first COT is initiated by the radio device.

11. The method of claim 10, wherein the radio communicating comprises:

determining, depending on the determinations, whether to use the temporal radio resource associated with first COT or the second COT for the radio communicating.

12. The method of claim 10, wherein the radio communicating comprises:

transmitting to the radio device in the temporal radio resource associated with the first COT or the second COT depending on the determinations.

13. The method of claim 10, wherein determining that the first COT is initiated by the radio device comprises receiving an uplink transmission from the radio device in the first COT.

14. The method of claim 10, wherein determining that the second COT is initiated by the radio device comprises:

performing a clear channel assessment (CCA); and transmitting in the second COT if the CCA is indicative of clearance.

15. The method of claim 10, wherein the network node refrains from receiving in the temporal radio resource associated with the second COT if the first COT is initiated by the radio device.

16. The method of claim 10, wherein the network node receives in the temporal radio resource associated with second COT if the first COT is initiated by the radio device.

17. A radio device for radio communicating between a radio device and a network node of a radio access network (RAN) using a temporal radio resource associated with a channel occupancy time (COT) the radio device comprising:

a memory and processing circuitry being configured to at least one of:

determine if a first COT is initiated by the radio device;

determine if a second COT is initiated by the network node; and radio communicate with the network node in the temporal radio resource associated with the first COT or the second COT depending on the determinations, the radio communicating comprising:

the radio device receiving in the temporal radio resource associated with the first COT if the second COT is initiated by the network node; and the radio device transmitting in the temporal radio resource associated with the second COT if the first COT is initiated by the radio device.

18. A network node for radio communicating between a radio device and the network node of a radio access network (RAN) using a temporal radio resource associated with a channel occupancy time (COT), the network node comprising:

a memory and processing circuitry configured to at least one of:

determine if a first COT is initiated by the radio device;

determine if a second COT is initiated by the network node; and radio communicate with the radio device in the temporal radio resource associated with the first COT or the second COT depending on the determinations, the radio communicating comprising:

the radio device receiving in the temporal radio resource associated with the first COT if the second COT is initiated by the network node; and the radio device transmitting in the temporal radio resource associated with the second COT if the first COT is initiated by the radio device.

* * * * *